US008788476B2

(12) United States Patent
Jones et al.

(10) Patent No.: US 8,788,476 B2
(45) Date of Patent: Jul. 22, 2014

(54) METHOD AND SYSTEM OF TRIGGERING A SEARCH REQUEST

(75) Inventors: Scott A. Jones, Carmel, IN (US);
Thomas E. Cooper, Indianapolis, IN (US); Jeff G. Jockisch, Westfield, IN (US)

(73) Assignee: ChaCha Search, Inc., Carmel, IN (US)

( * ) Notice: Subject to any disclaimer, the term of this patent is extended or adjusted under 35 U.S.C. 154(b) by 181 days.

(21) Appl. No.: 12/540,851

(22) Filed: Aug. 13, 2009

(65) Prior Publication Data

US 2010/0042619 A1    Feb. 18, 2010

Related U.S. Application Data

(60) Provisional application No. 61/089,168, filed on Aug. 15, 2008, provisional application No. 61/091,930, filed on Aug. 26, 2008.

(51) Int. Cl.
*G06F 17/30* (2006.01)

(52) U.S. Cl.
USPC .......................................... 707/706

(58) Field of Classification Search
USPC ................. 707/999.004, 702, 706, 769
See application file for complete search history.

(56) References Cited

U.S. PATENT DOCUMENTS

| | | | |
|---|---|---|---|
| 5,555,376 A | 9/1996 | Theimer | |
| 5,592,664 A | 1/1997 | Starkey | |
| 5,862,223 A * | 1/1999 | Walker et al. | 705/50 |
| 6,226,630 B1 | 5/2001 | Billmers | |
| 6,302,844 B1 * | 10/2001 | Walker et al. | 600/300 |
| 6,321,228 B1 * | 11/2001 | Crandall et al. | 1/1 |
| 6,327,355 B1 * | 12/2001 | Britt | 379/201.03 |
| 6,594,654 B1 | 7/2003 | Salam | |
| 6,654,749 B1 | 11/2003 | Nashed | |
| 6,763,349 B1 | 7/2004 | Sacco | |
| 6,779,019 B1 | 8/2004 | Mousseau et al. | |
| 6,856,967 B1 | 2/2005 | Woolston | |
| 6,873,982 B1 | 3/2005 | Bates | |
| 7,080,069 B2 | 7/2006 | Abe | |
| 7,117,207 B1 | 10/2006 | Kerschberg | |
| 7,162,480 B2 | 1/2007 | Vishik | |

(Continued)

FOREIGN PATENT DOCUMENTS

| | | |
|---|---|---|
| WO | 2007052285 A2 | 5/2007 |
| WO | WO 2007/052285 | 5/2007 |

OTHER PUBLICATIONS

International Search Report, PCT/US2009/053800, Mailing Date Feb. 24, 2011, International Filing Date Aug. 14, 2009.

(Continued)

*Primary Examiner* — Cam-Linh Nguyen
(74) *Attorney, Agent, or Firm* — Staas & Halsey

(57) ABSTRACT

A method and system are described for creating a recurring or triggered search request. A search request is associated with a condition which initiates an information search. A search result, including a search query associated with a search request and a condition may be provided to a user via any or all communication services and/or devices associated with the user. A tool is provided to enable a user to select an existing search request and/or search result which may be used to create a triggered or 'favorite' search query which may be triggered as designated. Triggered search requests may be suggested to a user using automated and/or human assisted techniques.

20 Claims, 21 Drawing Sheets

(56) References Cited

U.S. PATENT DOCUMENTS

| | | | |
|---|---|---|---|
| 7,200,563 B1 | 4/2007 | Hammitt | |
| 7,376,649 B2 | 5/2008 | Yang | |
| 7,539,656 B2* | 5/2009 | Fratkina et al. | 706/45 |
| 8,452,855 B2* | 5/2013 | Higgins et al. | 709/219 |
| 8,571,884 B2* | 10/2013 | Badgett et al. | 705/2 |
| 2002/0013711 A1 | 1/2002 | Ahuja | |
| 2003/0023584 A1 | 1/2003 | Brandin | |
| 2003/0061060 A1 | 3/2003 | Tenorio | |
| 2003/0120662 A1 | 6/2003 | Vishik | |
| 2004/0002972 A1 | 1/2004 | Pather et al. | |
| 2004/0193593 A1 | 9/2004 | Sacco | |
| 2004/0230572 A1 | 11/2004 | Omoigui | |
| 2004/0268419 A1 | 12/2004 | Danker | |
| 2005/0065773 A1 | 3/2005 | Huang | |
| 2005/0097188 A1 | 5/2005 | Fish | |
| 2005/0105712 A1 | 5/2005 | Williams | |
| 2005/0138115 A1 | 6/2005 | Llamas | |
| 2005/0165743 A1 | 7/2005 | Bharat | |
| 2005/0234957 A1 | 10/2005 | Olson | |
| 2005/0262005 A1 | 11/2005 | Woolston | |
| 2005/0283753 A1 | 12/2005 | Ho | |
| 2006/0018551 A1 | 1/2006 | Patterson | |
| 2006/0020571 A1 | 1/2006 | Patterson | |
| 2006/0020607 A1 | 1/2006 | Patterson | |
| 2006/0031195 A1 | 2/2006 | Patterson | |
| 2006/0036563 A1 | 2/2006 | Wu | |
| 2006/0041477 A1* | 2/2006 | Zheng | 705/14 |
| 2006/0047615 A1* | 3/2006 | Ravin et al. | 706/50 |
| 2006/0074934 A1* | 4/2006 | Dettinger et al. | 707/999.1 |
| 2006/0106792 A1 | 5/2006 | Patterson | |
| 2006/0106847 A1 | 5/2006 | Eckardt | |
| 2006/0242190 A1 | 10/2006 | Wnek | |
| 2006/0282312 A1 | 12/2006 | Carlson et al. | |
| 2006/0282336 A1 | 12/2006 | Huang | |
| 2006/0286530 A1 | 12/2006 | Forrest | |
| 2007/0061244 A1 | 3/2007 | Ramer | |
| 2007/0073678 A1 | 3/2007 | Scott | |
| 2007/0073745 A1 | 3/2007 | Scott | |
| 2007/0081197 A1 | 4/2007 | Omoigui | |
| 2007/0112765 A1 | 5/2007 | Vishik | |
| 2007/0136264 A1 | 6/2007 | Tran | |
| 2007/0156677 A1 | 7/2007 | Szabo | |
| 2007/0174244 A1* | 7/2007 | Jones | 707/999.003 |
| 2007/0174389 A1 | 7/2007 | Armstrong | |
| 2007/0185841 A1* | 8/2007 | Jones et al. | 707/999.003 |
| 2007/0185843 A1 | 8/2007 | Jones | |
| 2007/0208688 A1 | 9/2007 | Bandhole | |
| 2007/0260591 A1 | 11/2007 | Ahi | |
| 2007/0266164 A1 | 11/2007 | Balfanz | |
| 2007/0282795 A1 | 12/2007 | Mashinsky | |
| 2008/0091570 A1* | 4/2008 | Cella et al. | 705/27.1 |
| 2008/0172357 A1* | 7/2008 | Rechis et al. | 707/999.002 |
| 2008/0243828 A1 | 10/2008 | Reztlaff | |
| 2008/0313131 A1* | 12/2008 | Friedman et al. | 707/999.002 |
| 2009/0049044 A1* | 2/2009 | Mitchell | 707/999.006 |
| 2009/0228464 A1 | 9/2009 | Jones | |
| 2013/0013362 A1* | 1/2013 | Walker et al. | 705/7.14 |

OTHER PUBLICATIONS

Search Report for application PCT/US 09/36174, dated Apr. 20, 2009.

A Personalizable Agent for Semantic Taxonomy-Based Web Search Larry Kerschberg, et al., E-Center for E-Business, George Mason University, 2003.

Semantic Taxonomy Induction from Heterogenous Evidence, Rion Snow, et al., 2006.

Learning for Automatic Personalization in a Semantic Taxonomy-Based BG Meta-Search Agent, Wooju Kim et ai, Available online Sep. 27, 2002.

* cited by examiner

300

REQUEST RECORD

|  | Description | Example Content |
|---|---|---|
| 305 | Request ID | 'Request1.1' |
| 310 | Request content | 'What is the weather for today in Indy?' |
| 315 | Request structured content | 'What is the weather forecast today?' |
| 320 | Request user ID | 'User1' |
| 325 | Request category ID | 'Category1';'Category2' |
| 330 | Request profile ID | 'Profile1' |
| 335 | Request guide ID | 'Guide1' |
| 340 | Request resource ID | 'Resource2' |
| 345 | Request result ID | 'Result1.1' |
| 350 | Request location ID | 'Indianapolis, IN' |

TRIGGERED REQUEST RECORD

|  | Description | Example Content |
|---|---|---|
| 405 | Triggered request ID | 'Triggered request1.1' |
| 410 | Triggered request query ID | 'Request1.1' |
| 415 | Triggered request user ID | 'User1' |
| 420 | Triggered request delivery info | 'send text to user phone1';'reminder=off' |
| 425 | Triggered request location info | 'location=user device location' |
| 430 | Triggered request trigger condition | 'frequency=daily';'time=8.30EST' |
| 435 | Triggered request status | 'Active' |

USER RECORD

|     | Description | Example Content |
| --- | --- | --- |
| 505 | User ID | 'User1' |
| 510 | User profile ID | 'DemoprofileU1';'GeoprofileU1';'PersprofileU1' |
| 515 | User request ID | 'Request1.1';'Request1.2' |
| 520 | User triggered request ID | 'Triggered request1.1';'Triggered request1.2' |
| 525 | User communication info | usercomu1typ1='user1';<br>usercomu1typ2='user1@chacha.com';<br>usercomu1typ3='twitter:user1';<br>usercomu1typ4='317.924.2242' |

GUIDE RECORD

|     | Description | Example Content |
| --- | --- | --- |
| 605 | Guide ID | 'Guide1' |
| 610 | Guide category ID | 'Category1';'Category3' |
| 615 | Guide profile ID | 'Demoprofileg1';'Geoprofileg1';'Persprofileg1' |
| 620 | Guide result ID | 'Result1.1';'Result5.2' |
| 625 | Guide communication info | guidecomg1typ1='guide1';<br>guidecomg1typ2='guide1@chacha.com';<br>guidecomg1typ3='guide1@AIM';<br>guidecomg1typ4='317.224.2242'; |
| 630 | Guide request ID | 'Request1.1';'Request3.2';'Request5.4' |

RESOURCE RECORD

|     | Description | Example Content |
| --- | --- | --- |
| 705 | Resource ID | 'Resource4' |
| 710 | Resource guide ID | 'Guide1';'Guide2';'Guide3' |
| 715 | Resource description | 'weather chacha' |
| 720 | Resource access info | 'http://autoguides.chacha.com/weatherResults.aspx?zip="location"' |
| 725 | Resource category ID | 'Category1';'Category3' |
| 730 | Resource usage information | '90%';'60%' |

CATEGORY RECORD

| | Description | Example Content |
|---|---|---|
| 805 | Category ID | 'Category1' |
| 810 | Category description | 'Local>Weather' |
| 815 | Category guide ID | 'Guide1';'Guide2';'GuideN' |
| 820 | Category guide rating | '10';'6';'2' |
| 825 | Category resource ID | 'Resource1';'Resource2';'ResourceN' |
| 830 | Category resource rating | '8';'8.5';'3' |

PROFILE RECORD

| | Description | Example Content |
|---|---|---|
| 905 | Profile ID | 'Profile1' |
| 910 | Profile geographic info | 'Indiana' |
| 915 | Profile demographic info | 'under30'AND'over20' |
| 920 | Profile personality info | 'Foodie' |
| 925 | Profile guide ID | 'Guide1';'Guide3';'Guide2';'Guide4';'Guide5' |
| 930 | Profile guide rating | '2';'2';'1';'3';'3'; |

RESULT RECORD

| | Description | Example Content |
|---|---|---|
| 1005 | Result ID | 'Result1.1' |
| 1010 | Result guide ID | 'Guide1' |
| 1015 | Result content info | 'Indianapolis, IN 82F Fair<br>Today: HI/87 LOW/64 Sunny,<br>Tomorrow: HI/90 LOW/66 Sunny' |
| 1020 | Result resource ID | 'Resource4' |

ChaCha®

2100

Who is bob marley — 2102

Location: Jamaica — 2104
Raw Query: Who be Bob Mahley men — 2106

Search — 2108
Powered by Google™

Map Search — 2110c
Finders — 2110b
Categories — 2110a

- Olympics Beijing — 2112g
- People Finder — 2112f
- Advice Finder
- Weather Finder — 2112e
- Business DA/2111 — 2112d
- Joke Finder — 2112c
- Election Candidates +News — 2112b
- 2112a

Entertainment — Music, Movies, Literature

Sports — 2114b — Football, Baseball, Olympics

Travel — 2114a — Flights, Trips, Directions, Hotels — 2116a, 2116b, 2116c

Language — Define, Translate, How To

PoliticsGov — 2114c — Government, Laws, Military

Lifestyle — 2116d — Food, Fashion, Education, Green

Business — Finance, Careers, Economy

Society — Religion, Relationships, Family

Customer Service — ChaCha, Conversational

SciTech — Science, Math, Electronics

Health — Illness, Addiction, Fitness, Diet

Sex — Sex Organs, Sex Industry, Sexuality

Hot:

QL Site Links: Search for a QuickLink / Index of QuickLinks / Recommend a Site / Help
Related: Content.ChaCha.com / ChaCha.com Copyright © 2008 ChaCha Search, inc. Experimental Use

2300

| Society&Culture | Home::Society&Culture Cats: Society&Culture-History Society&Culture-Education |
|---|---|

*ChaCha®* QuickLinks

Location: None —2104
Query: Did Sampson have a mama? —2106

Who was Samson's mother? [Search] —2102

Map Search — Finders — Categories — Powered by Google —2108
2110c — 2110b — 2110a — 2112b Hot: Olympics Beijing | People Finder | Advice Finder | Weather Finder | Business DA/411 | Joke Finder | Election Candidates +News —2112a

| ☐ Cultures Ethnicities, Subcultures, Groups | ☐ Demographics Population, Segments, Stats —2214e | ☐ Education Schools, Vocations, Issues —2214d —2216e —2216d |
|---|---|---|
| World Culture | Demographics | 2216f School Info —2222c |
| Cultures of the World Country Based<br>Culture by Region<br>Regional Cultures Brief<br>List of Subcultures | U.S. Census Demographics<br>State & County Demographics<br>U.S. Labor Force Demographics<br>Ad & Marketing Demographics | K-12 School Info & Ranking —2220f<br>State Education Profiles —2220fg<br>US News Best Schools & Colleges —2220h<br>Vocational Schools Database & Info —2220j |
| Family Parenting, Siblings, Genealogy | World Stats | Organizations & Issues —2222d |
| | CIA Fact Book<br>International Demographics UN<br>Geo Hive | U. S. Dept. of Education —2220k<br>Directory of Organizations —2220m<br>Education Policy Issues —2220n |
| Parenting Resources | ☐ Historic Figures Philosophers, Explorers, Icons —2214f | Mentoring Youth |
| Everything Parenting<br>Parenting.com<br>Birth Order & Characteristics<br>Sibling Rivalry | | What is a Mentor?<br>Become a Mentor<br>Big Brothers Big Sisters |
| Genealogy | By Category | ☐ History Inventions, Events, Time Periods |
| Search for Ancestors<br>Ellis Island Immigration Search<br>Genealogy Link-sets | Women of History Historic Women<br>Stanford Encyclopedia of Philosophy<br>Biblio.com Authors<br>Explorer Wiki World Explorers<br>Artists Visual Artists<br>Architects Architects & Builders<br>IMDB.com Entertainers<br>Rulers.org Politicians & Leaders<br>Scientists Inventors & Scientists of History | Timeline |
| ☐ Folklore Mythology, Legends, Paranormal | | BBC History Most major events<br>Historic Event Timeline – Time Periods<br>Timelines by Subject<br>Inventions & Discoveries Timelines |
| Mythology | | by Subject |
| Encyclopedia Mythica | | History Online<br>History Link Portal<br>World History.net |
| Folklore | ☐ Relationships Dating, Friendship, Marriage | |
| American Folklore<br>Snopes Urban Myths & Legends<br>Encyclopedia Lorica<br>Folklore and Fairytales | Dating | |
| Paranormal | Top Dating Tips<br>Coolest Date Ideas<br>Date Movies | |
| Discovery Channel on Paranormal<br>Paranormal News and Info<br>Types of Paranormal Phenomena | Friendship | |
| | All About Friends<br>Maintaining A Friendship<br>Friendship Quotations | |
| | Marriage | |
| | Marriage Around the World<br>Marriage Advice & Info | |

QL Site Links: Search for a QuickLink / Index of QuickLinks / Recommend a Site / Help
Related: Content.ChaCha.com / ChaCha.com
Copyright © 2008 ChaCha Search, inc. Experimental Use

FIG. 23

RESOURCE RECORD 2600

| | Description | Example Content |
|---|---|---|
| 2605 | Resource ID | 'Resource1 for Sci Tech' |
| 2610 | Resource category | 'Category1 Sci Tech' |
| 2615 | Resource tile | 'Tile #6-4' |
| 2620 | Resource text | 'Brain Anatomy Guide' |
| 2625 | URL | 'http://www.waiting.com/brainanatomy.html' |
| 2630 | Comment | 'Guides & Factsheets' |
| 2635 | Format | 'font=arabic bold';color: #928232;' |
| 2640 | Source | 'chacha quicklinks' |
| 2645 | Type | 'URL' |
| 2650 | Date | 'created 18/Aug/08' |

FIG. 26

METHOD AND SYSTEM OF TRIGGERING A SEARCH REQUEST

CROSS-REFERENCE TO RELATED APPLICATIONS

This application is related to and claims the benefit of U.S. patent application Ser. No. 12/398,454, inventor Scott A. Jones, et al., titled "METHOD AND SYSTEM FOR TRIGGERING A SEARCH REQUEST", filed Mar. 5, 2009; and, U.S. patent application Ser. No. 11/774,852, inventor Scott A. Jones, et al., titled "METHOD AND SYSTEM FOR SHARING AND ACCESSING RESOURCES", filed Jul. 9, 2007; and, U.S. patent application Ser. No. 11/835,016, inventor Scott A. Jones, et al., titled, "ELECTRONIC PREVIOUS SEARCH RESULTS LOG", filed Aug. 7, 2007. In addition, this application is related to and claims the benefit of U.S. Provisional Application Ser. No. 61/089168, inventor Scott A. Jones, et al., titled "METHOD AND SYSTEM FOR TRIGGERING A SEARCH REQUEST", filed Aug. 15, 2008; U.S. Provisional Application Ser. No. 61/091930, inventor Scott A. Jones, et al., titled "METHOD AND TOOLS FOR IMPROVING UTILIZATION OF HUMAN SEARCHERS", filed Aug. 26, 2008, the contents of which are incorporated herein by reference.

BACKGROUND

1. Field

The invention relates to search engine technology and specifically to search engines which utilize human searchers or guides. A method and system is disclosed whereby any request may be modified to become a request initiated responsive to an arbitrary trigger event.

2. Description of the Related Art

In current search systems, a user may submit a search request which may include words, phrases and/or other information. A user may receive a search result responsive to a search request. Likewise, a user may elect to receive a notification regarding information from various sources. For example, a user may receive an alert via text, email, or other forms of messaging when a specific trigger event occurs, such as a change in a stock price, a final or partial score in an athletic event, a news alert, etc. Such alerts may be received by selecting from a menu of items offered by various service providers such as brokerage houses, telecommunications providers, news services, etc. A user may subscribe to such services using various mechanisms such as a web service, a text message service, or a service based on any types of communication services.

A user may be able to provide a request to a human assisted search service which may be an arbitrary request. As a human may interpret a request, it is not necessary that the request conforms to any specific configuration or grammar. Services such as the ChaCha® search service or the AQA service. A person may wish to know information of an arbitrary request based on a condition which may be an arbitrary event. As described in the related U.S. patent application Ser. No. 12/398,454 previously mentioned a user may employ a human assistant or guide to create a request which is initiated responsive to an indefinite condition.

A user may submit the same or similar queries on multiple occasions. However, there is no method or system whereby a user may create a recurring request including based on the frequency of a request. Likewise, a user might desire to make a recurring request based on requests made by other users with similar interests. However, there is no system or method of sharing queries which are associated with multiple users.

In a typical human assisted search system, a search request or search query is directed to a person who may perform an information search responsive to the search request and provide a search result to a user. Such systems have been implemented by companies such as AskMeNow, AnyQueryAnswered, and others. For example, US Published application 20050289130 by Cohen et. al., describes a system whereby a query is received from a user device, transcribed, and a response provided to a user as a text message on the user device. Likewise US Published application 20070219987 by Meyers describes a system whereby text queries may be processed and answers returned to a user. Such systems have encountered difficulty as a searcher must perform a search in a minimum amount of time in order to improve customer experience as well as reduce the cost to serve a customer. Several efforts have been made in this area by companies such as FoneWeb as exemplified by US published application 2007/0208570. Such systems may process a query in order to identify the subject matter, but once subject matter is identified, a searcher may spend significant time and effort in finding a relevant result.

In light of this and other existing problems, a method and system whereby a user of search services may create and manage favorite question(s) which may be repeated based on various criteria is needed.

SUMMARY

A system and method is provided whereby a user may submit a request and may designate the request for information to be triggered based on a requested condition. A search request history is maintained which may be made available for review. A selected request may be converted into a recurring or triggered request. A human guide may be utilized to clarify a request, identify a result and/or a resource which may provide information which may be used to trigger or initiate and/or respond to a request. A user may be presented with a search result responsive to a request using contact information provided by the user. A search result and/or a notification may be provided to a user based on a triggered request.

A tool is provided to manage favorite queries and identify and adapt requests indicated in a database of requests. A query history associated with a user may be analyzed for various purposes. In at least one embodiment, messages may be targeted to a user based at least in part on previous requests and/or results provided. Information of a request may be provided to a guide who may determine that a user may wish to receive a result based on a triggered request. A guide may obtain various types of information which may be used to provide a user with opportunities to obtain information.

These together with other aspects and advantages which will be subsequently apparent, reside in the details of construction and operation as more fully hereinafter described, reference being had to the accompanying drawings forming a part hereof, wherein like numerals refer to like parts throughout.

BRIEF DESCRIPTION OF THE DRAWINGS

Aspects and advantages of the invention will become apparent and more readily appreciated from the following description of the embodiments, taken in conjunction with the accompanying drawings, of which:

FIG. 3 illustrates a database record for a request

FIG. 4 illustrates a database record for a triggered request

FIG. 5 illustrates a database record for a user.

FIG. 6 illustrates a database record for a guide.

FIG. 7 illustrates a database record for a resource.

FIG. 8 illustrates a database record for a category.

FIG. 9 illustrates a database record for a profile.

FIG. 10 illustrates a database record for a result.

FIG. 21 illustrates a GUI for accessing general resources.

FIG. 23 illustrates a GUI for accessing categorized resources.

FIG. 26 illustrates a database record for a resource.

DETAILED DESCRIPTION OF THE PREFERRED EMBODIMENTS

Figure 1:
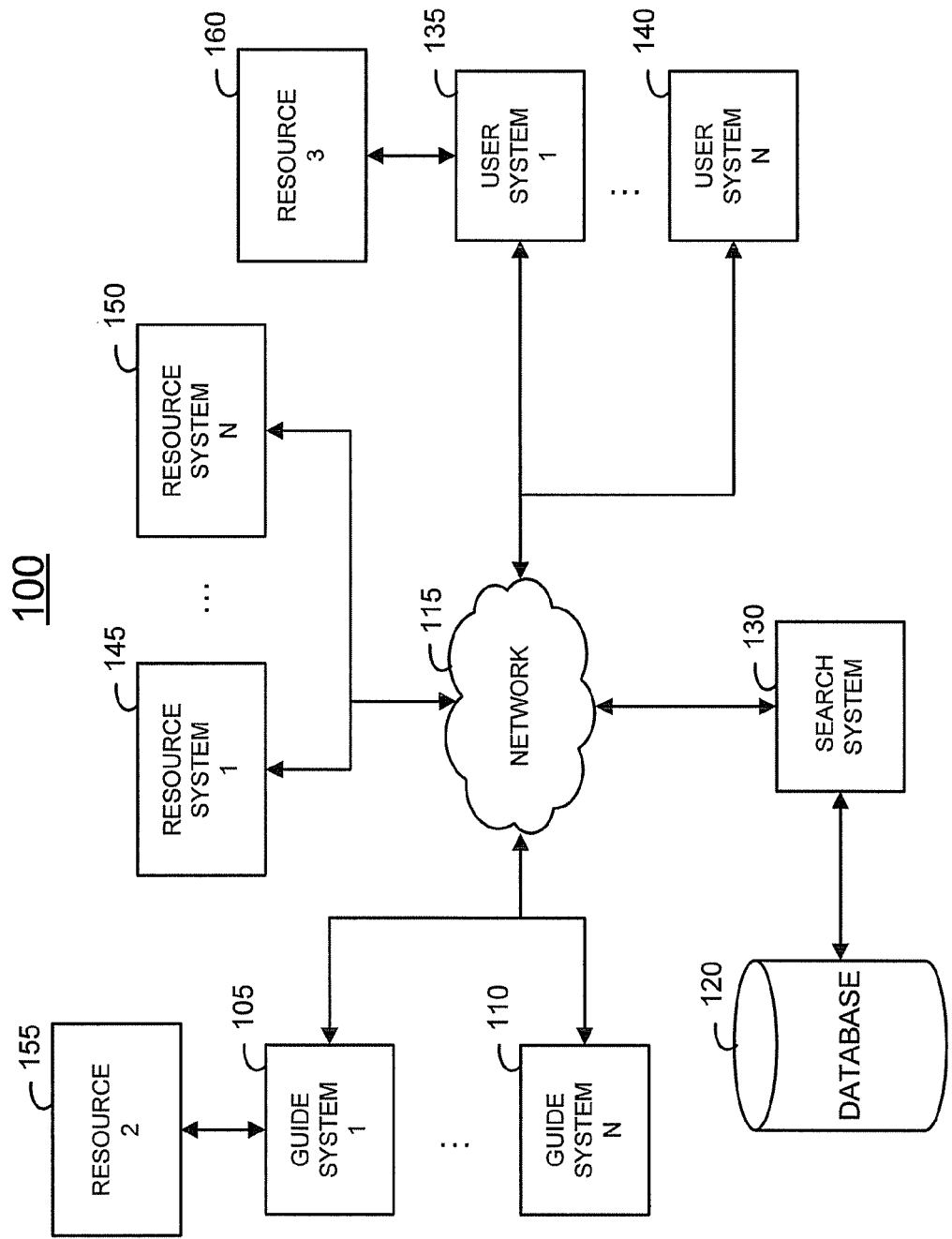
FIG. 1 is a block diagram of an exemplary system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate. As used herein words importing the singular shall include the plural and vice versa unless specifically counter indicated.

A search request, which may include a keyword, a phrase, and/or a fully formed sentence, and/or information such as images, audio, video, or any type of media, is received by a search system utilizing the assistance of human searchers or guides. A search result is provided to a user responsive to a search request or request. A search result may be produced using any resource and/or other information which may be accessible to a guide or a search system. A determination is made as to whether a user wishes to create a request which is initiated by a condition, also referred to as a recurring request or triggered request. A trigger or recurrence condition is established and recorded in a database. A resource which may provide a search result and/or information regarding a trigger condition may be recorded in a database. A search result and/or a notification is provided to a user based on a recurring request. A user may elect to receive an alert relating to a topic and/or event. A user may reply to an alert and/or query response to submit a search request. A guide may be selected to respond to a search request based at least in part on content of and/or other information associated with a reply to an alert.

A search history may be provided to a user and/or a guide. Information included in a search history may be used to create a triggered search request. A URL or other information which indicates a triggered search request may be provided. Information of a triggered search request may be provided to one or more users. A user may elect to be added to a list of users associated with a recurring search request. Information provided to a user may allow a different user to be added to a list of users associated with a recurring search request. A user may elect to receive a search result using any communication service associated with a user. A search result may be returned to a user device based on an occurrence of a condition. Information of a recurring search request may be designated by a user, which may modify the content of the search request when a trigger condition occurs.

A search history may be provided based on a search request and/or a search result which is associated with a number of identifiers associated with a user. A search history may be presented using a GUI. A user may elect to create a recurring search request using a current search request, and/or using a previous search request. A guide may interact with a user in order to create a recurring search request. A human searcher or guide may interact with a user in order to determine a condition which may be associated with a recurring search request. A guide may create a triggered search request.

Controls are provided for managing triggered search requests associated with a user. A user may change information of a recurring search request using controls provided to a user. A user may be provided with controls for filtering search requests in order to create a triggered search request. A user may be presented (prompted) with advertisements and/or other information based at least in part on queries and/or search results associated with a triggered or 'favorite' query associated with the user. An advertisement may be selected at least in part based on a number of times that a trigger condition has occurred. Any information associated with a triggered request may be used to target information to a user. A user and/or a guide may be provided with triggered request or recurring query suggestions which are based on information associated with a user and/or a guide. A guide may be provided with information of user responses associated with recurring queries. A guide may interact with a user to optimize triggered requests associated with a user.

A "user" is any person or entity which may submit a request or search request. A "request" or "search request" or "query" is any request for information which may be originated by a person and/or a device or system. A user may be referred to as a "requester", information seeker or InfoSeeker™.

A "guide" is any person who may be compensated and/or may be a volunteer who may respond to and/or assist with a request. An "ambassador" is a guide who may perform processing of a request and/or a search result. A "searcher" is a guide who may perform an information search responsive to a request. A "transcriber" who may also be a guide may convert a spoken portion of a request into text, and/or may otherwise convert information of a request from one form to another. A guide may be referred to as a "human assistant" or "human searcher" or "searcher". A guide may perform any type of task. Any guide may act in any defined guide role. However, a human assistant who performs a task and a guide who conducts a search may not necessarily be the same. For example, a human assistant may perform a task to facilitate a search which is conducted by another person who is registered as a guide. A "guided request" is a request which uses the assistance of one or more guides.

An "identifier" or ID may include character, number and/or other type of information which may be used to identify an item including with respect to an item of a database. Items may include but are not limited to a guide, a user, a resource, an advertisement, a keyword, a category, a search result, a search request, a query, a rating, ranking, a message and/or a profile.

A "result" or "search result" or "answer" is any information which may be provided responsive to a request. A result includes, but is not limited to, any of an advertisement, a link to a web page, a message of any sort, image, audio, text, games, interactive media and/or software of any sort.

A "search resource" or "resource" is any source of information which may be used to obtain data including a search result. A search resource includes automated and/or human-assisted systems, any repository of information, and any type of media and/or systems which may provide information. A resource may be a provider or source of item and/or service. For example, a resource might provide an item such as a ringtone, a media file (e.g., audio, video, images, games, etc.), information such as news, lyrics, song titles, translations or any other type of information. A resource may be automated, and/or may utilize the assistance of a person.

A "profile" is one or more characteristics which may be associated with a person. Profile characteristics include but are not limited to demographic, geographic, personality, affiliations, areas of interest, historical actions, preferences, memberships, associations, etc.

An "advertisement" is any information which may be delivered to a user including to promote a provider, a product, a service, etc. An advertisement may include text, links, audio, video, images, printed materials, interactive media such as a game, or other forms of media which may be provided to a user device.

A "category" or "taxonomy branch" or "categorization" is a unique node within an index which may be associated with any number of items. If a request is associated with a category, items associated with the category may be more likely to be selected responsive to the request.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other type of communication. A connection or communication session may be established using any device which is capable of utilizing a communication service. For example, a wireless device such as a cell phone, PDA, smart phone, etc., might be used to establish a communication session using voice, SMS, IM, email and/or internet protocols. A desktop, laptop or server system might be used to establish a communication session. A landline phone, a specialized communication terminal, or any other communication device might be used to establish a communication session.

Communication between a guide, a user, a resource and/or a search system may include conversion of text to speech and speech to text. Any type of conversion and/or other processing of information which may facilitate communication between a user, a guide, a resource and/or a search system may be performed by an element of the system 100 (FIG. 1). Any type of media which can be sent and/or received using a communication system may be part of a communication session. A communication session may be conducted using any or all communication service associated with a user, a resource and/or a guide. Any communication session may include communication via multiple service and/or device. For example, a request may be submitted as a voice query, which might indicate an image located on a resource accessible to a user and/or a guide, the voice query might be converted to a text message, the image might be processed in order to associate a tag and/or other images with the image, and a response might be provided as a spoken reply to a mobile phone associated with a user, and a video presentation which is accessible via a high-speed connection, which might be delivered to a browser functionality of a different user device.

An advertisement may be transmitted including during any or all communication sessions between a user, a guide and/or a search system. A resource, a guide, and/or an advertisement may be rated. Rating information may be obtained from a user, a guide, a resource and/or a search system. Rating information may be used to select a resource, a guide, an advertisement and/or any item based on information associated with an item indicated in a database. A search service may be compensated by advertising revenue. Advertising or content may be delivered to a user, and/or guide using any service associated with a user and/or guide As illustrated in FIG. 1, system 100 includes guide system 105, 110, a network 115 such as the Internet, a search system 130, user system or information seeker system 135, 140, a database 120, which may comprise various records, a resource 155, and resource systems 145, 150, and a resource 160.

While only a limited number of systems associated with a guide (also referred to as a human searcher or human assistant), resource (also referred to as a search resource), user (also referred to as an information seeker or requester) and as a search system are depicted in FIG. 1, it is within the scope of the disclosure for multiple systems for guide, resource, information seeker and search systems to be utilized.

Any user system (e.g., the user systems 135, 140) can be operated by an information seeker, who may be any person, to submit a search request to the search system 130 and/or receive a search result and/or other information. Any guide system (e.g., the guide systems 105, 110) can be operated by a human searcher to obtain a search result responsive to a request which may have been submitted by an information seeker located at a user system (e.g., the user systems 135, 140). Any resource system (e.g., the resource systems 145, 150) may be operated by a human provider of information and/or may be an automated system which may provide a search result and/or other information to a guide and/or a user, such as a search engine, a database, a local information source of a guide system such as a disk or removable memory, etc. A resource may not be accessible using the network 115. For example, a resource such as the resource 155 may be accessible to a guide operating a guide system such as the guide system 105, or a resource such as the resource 160 'Resource 3' may be accessible to a user operating the user system 135. A resource might include printed materials, images, video, and/or audio information, a software application, any information accessible to a guide, a user, a database, a system and/or any combination thereof.

The network 115 (FIG. 1) may be a global public network of networks (the Internet) and/or consist in whole or in part of one or more private networks and communicatively couples the guide systems 105, 110, the resource systems 145, 150 and the user systems 135, 140 with the other components of the system such as the search system 130, and the database 120. The network 115 may include one or more wireless networks which may enable wireless communication between the various elements of the system 100. For example, a mobile phone carrier network might be used to connect a user device to the search system 130.

The search system 130 allows interaction to occur among the guide systems 105, 110, the resource systems 145, 150 and the user systems 135, 140. For example, an information search query can be transmitted from the user systems 135, 140 to the search system 130, where a search query can be accessed by the guide systems 105, 110 and/or the resource systems 145, 150. Similarly, a search result or response produced from the resource systems 145, 150 using the guide systems 105, 110 in response to a search query submitted by the user systems 135, 140 may be transmitted to the search system 130, where it may be stored by the search system 130 and/or may be transmitted to the user systems 135, 140. Any type of communication between a user, a guide, and a resource may be mediated and/or facilitated by the search system 130, and/or other elements of the system 100.

The search system 130 is communicatively coupled with the database 120. As will be described herein in further detail below, the database 120 includes data that is processed in association with operation of the embodiments. Although FIG. 1 illustrates the database 120 as a separate component of the system, the database 120 may be integrated with the search system 130. Further, the records maintained in the database 120 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100. Any or all elements of the system 100 may include any or all of the database 120.

The user systems 135, 140, the guide systems 105, 110, the search system 130 and the resource systems 145, 150 may include equipment, software, systems and personnel required to send and/or receive messages between a user system, a guide system, a resource system and/or the search system using the network 115. The database 120 includes information which may allow the search system 130 to establish communication between any or all of the elements of the system 100.

A user system, a guide system, and/or a resource may be a desktop or mobile PC or Mac®, a mobile phone, a smart phone, a PDA, a server system, a landline phone, a specialized communication terminal, a terminal connected to a mainframe, or any other communication device and/or system. The search system 130 may include one or more servers, computers, etc. For example, servers such as the PowerEdge® 2900 by Dell, or the BladeCenterJS22 by IBM, or equivalent systems might be used to implement elements of the search system 130. The search system 130 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems and/or communication devices known in the art may be used as user systems, guide systems, resources, and/or to implement the search system 130.

A guide may be required to register with the search system 130. As part of a registration process, at least one communication method is associated with a guide. In at least one embodiment, a guide may register with the search system 130 and establish a username and password which are associated with the guide. A guide may login to the search system 130 using a web browser functionality of the guide system 105 in order to communicate with the search system 130. Multiple communication services may be associated with a guide and may allow a communication session to be established between a guide system such as the guide system 105 and a user system, a resource system and/or the search system 130. Multiple identifiers of a guide may be associated with each other. Information such as IM credential, an email address, a phone number, a URL, a username, etc., of a guide may be identified which may allow the search system 130 to establish a communication session between a guide system and a user system, a resource system, and/or the search system 130.

When a guide registers with the search system 130 the guide may be associated with one or more keywords, categories, and/or other information. For example a keyword or category may be selected by a guide, or may be associated with a guide based on a test administered to a guide and/or other information provided during and/or after a registration process. Information associated with a guide may be stored in the database 120 and may be used for purposes such as matching a guide to a user request, determining and/or providing compensation for a guide, communicating with a guide, etc., as will be described further herein.

A user may be identified by the search system 130. When a user system such as the user system 135 establishes a communication session with the search system 130, an identifier of a user system is determined. An identifier of a user system may be associated with other information regarding a user. A user system may be identified using an email address, a telephone number, an IM credential, a username, or any other identifier which may be used to associate information with a user. Multiple identifiers of a user may be associated with each other. Using information of communication services associated with a user, a communication session may be established between a user system such as the user system 135 and a guide system, a resource system and/or the search system 130. Information such as a keyword, a category, a user profile, a previous search request, a search result, etc., may be associated with a user. Information of a user may be stored in the database 120.

A resource, which may be a person, an entity, a search engine, a database, a software application, a corpus of one or more types of media such as text or printed information, images, audio, video, etc., or a combination thereof may be identified by the search system 130. Any source of information may be a resource within the context of the disclosure herein. Information of at least one method of communication is associated with a resource system which allows a communication session to be established between the search system 130, a user system and/or a guide system and a resource system such as the resource systems 145, 150. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 145 and a user system, a guide system, and/or the search system 130. Information such as a keyword, a category, a profile, or other information may be associated with a resource. Information of a resource may be stored in the database 120.

A resource such as the resources 155, 160 and/or resources accessible via the resource systems 145, 150 may include any system, software, hardware, personnel and/or other facility which may provide information to a guide, a user, a resource and/or the search system 130. For example, a resource may be a search engine, a database system, a library, a personal hard drive and/or other local storage, printed materials, recordings of any sort, a software program, a person or person, an organization, etc. A resource may be freely accessible to any user and/or guide and/or may be available on a restricted basis. The resource systems 145, 150 may include resources which are available on an unrestricted and/or restricted basis. A resource may not be accessible using the network 115, but may be accessible to selected guide. For example, a resource such as the resource 155 may be accessible to one or more guides operating a guide system such as the guide system 105 using any type of communication. For example, a guide may obtain information of an event by observation and/or other means to provide a search result. Information in any form, such as printed media, audio and/or visual information, software, hardware, etc., which may be accessible to a guide, a user and/or an operator of a resource system may be a resource.

The search system 130 may establish a communication session between any user system, guide system and/or resource system using information indicated in the database 120. For example, the user system 135 may establish a voice communication session with the search system 130, the search system 130 may establish a voice communication session between the user system 135 and the guide system 105, and the search system 130 may establish a voice communication session between the user system 135 and the resource system 145. While a voice communication session is used in this example, any type of communication session using one or more services such as SMS, EMS, MMS, email, IM, chat, web based communication, etc., may be established between any user system, guide system, and/or resource system and/or the search system 130.

Information associated with a user, a guide and/or a resource may be obtained in various ways. For example, a registration process may be performed using a web form provided by the search system 130, and/or information may be obtained from an external database, and/or information may be obtained based on analysis of information indicated by a user, a guide, and/or a resource. A profile may include one or more characteristics which may be associated with one or more individuals. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device, service, transaction and/or any information which might be associated with a user and/or a guide.

Figure 2:
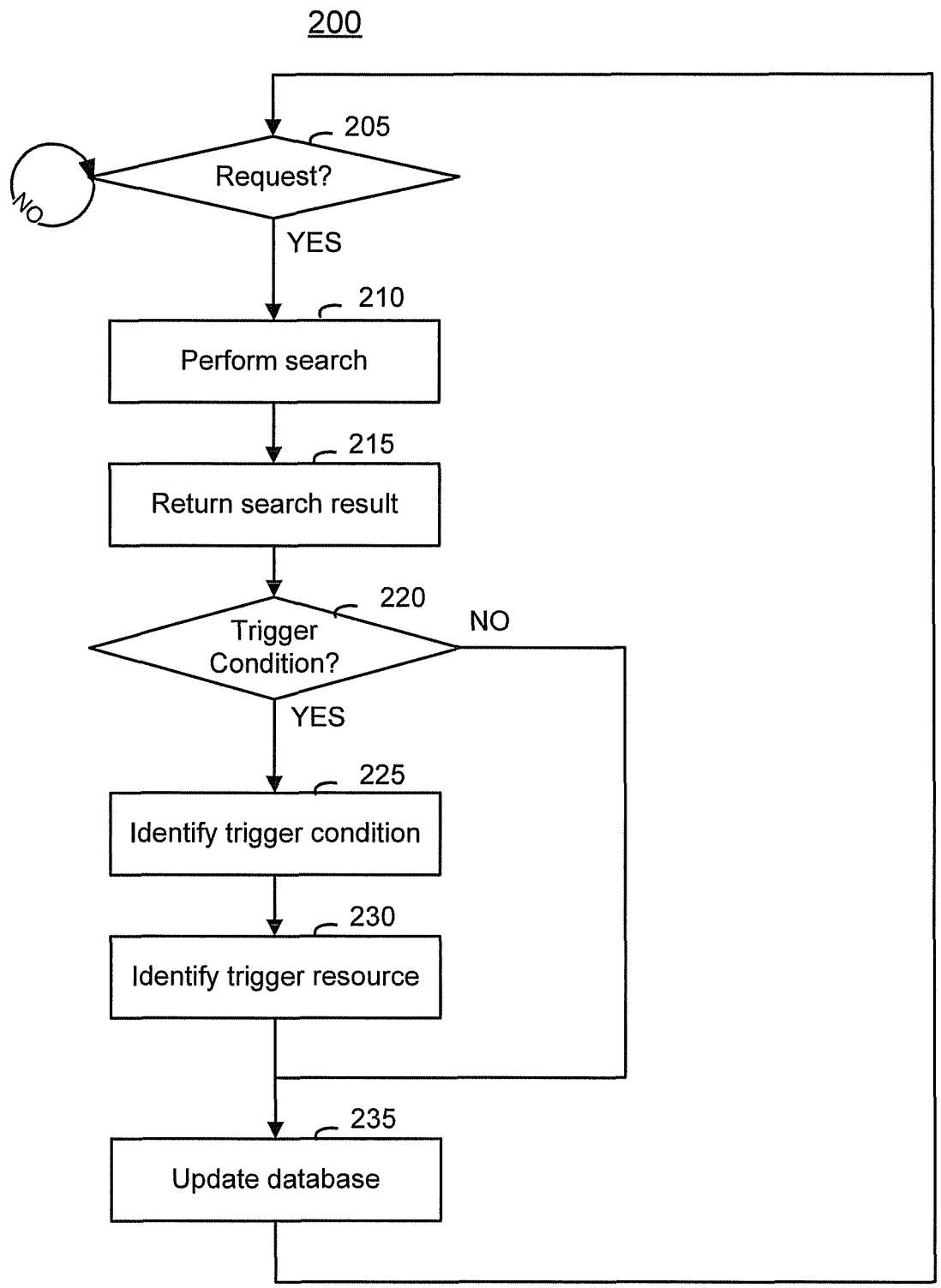
FIG. 2 is a flowchart of a process for creating a triggered search request.

As illustrated in FIG. 2, a process 200 for performing an information search is provided. The process 200 may be operative including on a server associated with the search system 130 (FIG. 1).

In operation 205 a determination is made as to whether a request is received. If in operation 205 (FIG. 2) it is determined that a request is not received, control remains at operation 205 and process 200 continues. If in operation 205 it is determined that a request is received, control is passed to operation 210 and process 200 continues.

The determination in operation 205 may be made based on various criteria. For example, a user may transmit a request from a user system which is running web browser software via the Internet to a server of the search system 130 (FIG. 1), or a user may call an access number which establishes a voice connection between a user system and the search system 130, or a user may transmit a text message to a short code associated with the search system 130, or a user may send an IM message to an IM identifier associated with the search system 130, etc. A user may utilize any type of system to submit a request to the search system 130. Multiple user systems may be utilized to submit a request. A request is not constrained. In at least one embodiment a request may be determined to be received based on a condition associated with a triggered request. For example, a request may be triggered based on time information such as day, date, hour, etc., an event such as a change in a value of a price or other information, a change in inventory at a business, and/or any condition which may be identified based on information accessible using the system 100.

In operation 210 (FIG. 2) a search is performed. An information search may be performed using the assistance of a guide, and/or an automated search may be performed. For example, a request may be presented to a guide who is ranked highest for performance among guides registered with the search system 130 who conducts a search to obtain requested information. A request may be provided to an automated resource which may provide a search result. Further, any of the search techniques disclosed in U.S. patent application Ser. No. 11/336,928, titled A SCALABLE SEARCH SYSTEM USING HUMAN SEARCHERS, inventor Scott A. Jones, filed Jan. 23, 2006 and/or U.S. patent application Ser. No. 12/275864, titled METHOD AND SYSTEM FOR IMPROVING UTILIZATION OF HUMAN SEARCHERS, inventor Scott A. Jones, filed Nov. 21, 2008 may be utilized to perform a search in operation 210. Control is passed to operation 215 and process 200 continues.

In operation 215 a result is provided to a user responsive to the request received in operation 205. A result may be provided using any communication service and/or system associated with a user. A result may be provided to any or all users associated with a request received in operation 205. For example, a result may be provided to a user via a text message delivered to a mobile phone associated with a user, and a result may be provided to the user via a browser function of a user system, and a result may be provided utilizing a voice message to a second user via a VoIP telephone number associated with the second user. Any number of results may be provided to any number of users associated with a request. An advertisement and/or other information may be presented to a user before, simultaneously with and/or after a result is provided. Control is passed to operation 220 and process 200 continues.

In operation 220 a determination is made as to whether a request is to be associated with a trigger condition. If in operation 220 it is determined that a request is to be associated with a trigger condition, control is passed to operation 225 and process 200 continues. If in operation 220 it is determined that a request is not to be associated with a trigger condition, control is passed to operation 235 and process 200 continues.

The determination in operation 220 may be made based on various criteria. A user may make the determination in operation 220. For example, a GUI such as the query selection GUI 1200 illustrated in FIG. 12, which is discussed in detail below, may be presented to a user to enable the user to elect to associate a trigger condition with a request. The determination in operation 220 may be made based on information included in a request. For example, a request such as 'tell me the score in the IU basketball game when it changes' might create a request (e.g., 'what is the score of the IU basketball game') and a trigger condition associated with the request (e.g., repeat if a previously provided score is not the same as a new or current score). A guide may interact with a user to determine whether a trigger condition is to be associated with a request. For example, if a user requests to know the weather condition in a particular location, a guide may obtain a result and/or may ask (prompt) the user's interest in being provided with additional and/or other relevant information based on a condition and/or other criteria. A guide may determine that a trigger condition is to be associated with a request. An automated system may determine that a trigger condition is to be associated with a request. Any combination of any number of user(s), guide(s) and/or automated system(s) may be used to determine that a trigger condition is to be associated with a request.

In operation 225 a trigger condition is identified and may be associated with a request. A trigger or recurrence condition is one or more criteria which can cause a request to be initiated. A request may be initiated based on and in association with a trigger condition including at a predetermined time interval, at a designated time, when a change occurs in information, etc. A trigger condition may be any condition which may or may not occur and/or may or may not occur periodically, and is not constrained.

A user may identify or formulate a trigger condition associated with a request. For example, a user may be presented with a GUI such as the condition selection GUI 1300 (FIG. 13) or a user may identify a trigger condition using a voice menu, a touch-screen interface, etc. A guide may identify a trigger condition associated with a request. For example, a guide may determine a trigger condition based on interaction with a user. A guide may perform an information search in order to identify a trigger condition associated with a request. A trigger condition may be identified which may require one or more resources and/or other information to be obtained. For example, a user may request a trigger condition which utilizes information which is not accessible to the search system 130. A guide may obtain information and/or identify a resource which may provide information which is relevant to a trigger condition. A trigger condition may be identified by an automated system. Any combination of a user, a guide, and/or an automated system may be used to identify or formulate a trigger condition associated with a request. In at least one embodiment, a guide and/or a user may be provided with suggested recurring queries. For example, if a user matches a profile, or if a query is associated with a category and/or keyword, or for any suitable reason, a suggested triggered request may be provided. Control is passed to operation 230 and process 200 continues.

In operation 230 a trigger resource is identified and may be associated with a request and/or a trigger condition. A trigger resource is a resource which may be relevant to a trigger condition. Control is passed to operation 235 and process 200 continues.

A trigger resource may be identified in various ways. A guide, a user and/or an automated system may identify a trigger condition resource or trigger resource. For example, a time interval, or a date and/or time trigger might be identified as a trigger condition, which would require a calendar type resource, which may be included in the search system 130 (FIG. 1) and/or other elements of the system 100. A watching service which provides monitoring of items such as prices of a commodity or equity, sporting events, news information, or any other resource which might provide information which may indicate whether one or more trigger condition has been met might be identified. Using the sports example above, a resource such as an RSS feed which updates whenever a change in scoring occurs might be identified as a trigger condition resource. A trigger condition resource may not be an automated system. For example, a person operating a guide system such as the guide system 105 might be identified as a trigger condition resource. In such a case, a guide might transmit a message regarding any or all trigger criteria associated with a request. Information obtained from trigger resource may be used with other information to determine whether a trigger condition has been met. A trigger condition resource may be associated with a keyword, a category, a profile of a guide and/or a user, an advertisement, a request and/or any other information indicated in the database 120 which may assist a guide and/or a user of the system 100 to identify and/or utilize a trigger condition and/or resource. While a single trigger resource is illustrated in FIG. 2, the present is not limited to any number of resource(s). For example, a request may be triggered based on occurrence of a condition as indicated by two different resources.

In operation 235 information of a triggered request is recorded. In at least one embodiment, the database 120 is updated with information of a triggered request. Information related to a user, a guide, a request, a resource, an advertisement, a result, and/or other item may be recorded, updated and/or modified and/or associated with each other. For example, a trigger condition, and a trigger resource may be associated with a request, a guide, a user, etc. Rating of any item may be recorded and/or modified. Control is passed to operation 205 and process 200 continues.

As illustrated in FIG. 3, an exemplary request record 300 of which one or more may be associated with or resident in the search database 120 (FIG. 1) is provided. The request record 300 may include a request record ID field 305, a request content field 310, a request structured content field 315, a request user ID field 320, a request category ID field 325, a request profile ID field 330, a request guide ID field 335, a request resource ID field 340, a request result ID field 345, and a request location ID field 350.

The request record ID field 305 contains an identifier of a request, which is preferably unique and preferably used consistently. For example, in at least one embodiment, the request record ID field 305 can include a randomly generated numerical code, and/or a string indicating a request. A request record ID serves to distinguish a request record associated with a request from a request record associated with other requests. Although particular examples of identifiers are described herein, other types of identifiers uniquely indicating a request may be utilized without departing from the spirit and scope of the embodiments. In at least one embodiment, the request record ID includes a telephone number. A request record ID may include a username, an IM credential, an email address, etc. Using the example in FIG. 3, 'Request1.1' is the request record ID associated with the request record 300.

The request content field 310 may include information of content associated with a request. Text, images, audio, video, or any other type of media may be indicated in the request content field 310. In at least one embodiment, an indicator of an audio recording of a user request and text which represents a transcription of the audio may be indicated in the request content field 310. Any information which may be associated with the content of a request may be indicated in the request content field 310. Using the example illustrated in FIG. 3, the text 'what is the weather for today in Indy?' is associated with the request 'Request1.1', which may indicate a request for weather information.

The request structured content field 315 may include information of a structured query associated with a request. A structured query may be created by a guide responsive to a user request. A structured query may be used to provide an automated response, to improve re-use of previous search results and/or resources, etc. Using the example illustrated in FIG. 3, 'What is the weather forecast for today?' is the structured query associated with 'Request1.1' which may indicate that a response may be provided based on the query 'What is the weather forecast for today?' and other information such as the location information indicated in the request location ID field 350. For example, an automated resource which provides weather information might be queried to provide a response to 'Request1.1'

The request user ID field 320 may include an identifier of a user associated with a request. Content of the request user ID field 320 may be used to establish communication with a user based on the content of a user record such as the user record 500 (FIG. 5). Using the example in FIG. 3, the user ID 'User1' is associated with the request 'Request1.1' which may indicate that 'User1' has submitted the request 'Request1.1'.

The request category ID field 325 may include an identifier of a category and/or keyword associated with a request. Content of the request category ID field 325 may be used to indicate a category and/or keywords associated with a request. A category may be associated with a request automatically. For example, a keyword identified in content associated with a request may be used to associate a category with a request. A category may be associated with a request based on actions of a user and/or a guide. For example a guide may select a category to be associated with a request. Using the example in FIG. 3, 'Category1' and 'Category2' are associated with the request 'Request1.1' which may indicate that information associated with 'Category' and 'Category2' may be used to select information to be associated with the request 'Request1.1'. For example, a guide, a resource, an advertisement, a search result and/or other item may be selected based at least in part on information associated with 'Category1' and 'Category2' responsive to 'Request1.1'

The request profile ID field 330 may include an identifier of a profile associated with a request. Content of the request profile ID field 330 may be used to obtain information of a profile associated with a request. A profile may be associated with a request automatically. A profile may be associated with a request based on actions of a user and/or a guide. Using the example in FIG. 3, the profile 'Profile1' is associated with the request 'Request1.1' which may indicate that information associated with 'Profile1' may be used to select a number of items to be associated with 'Request1.1'. For example, a guide, a resource, an advertisement, a search result and/or other item may be selected based at least in part on information associated with the profile 'Profile1' responsive to 'Request1.1'.

The request guide ID field 335 may include an identifier of a guide associated with a request. The content of the request guide ID field 335 may be used to obtain information of a guide associated with a request. For example, a guide ID may indicate a record such as the guide record 600 (FIG. 6). A guide may be associated with a request automatically. A guide may be associated with a request based on actions of a user and/or a guide. Using the example in FIG. 3, the guide 'Guide1' is associated with the request 'Request1.1' which may indicate that 'Guide1' has responded to the request 'Request1.1'. For example, a guide who may perform an activity such as a transcription, a search, a categorization, and/or other activity responsive to a request may be indicated in the request guide ID field 335. The content of the request guide ID field 335 may be used to establish communication with a guide based on the content of a guide record such as the guide record 600 (FIG. 6). A guide may be selected based at least in part on information associated with a category, a profile and/or other information associated with a request and a guide.

The request resource ID field 340 may include an identifier of a resource associated with a request. Content of the request resource ID field 340 may be used to indicate a resource associated with a request. A resource may be associated with a request automatically. A resource may be associated with a request based on actions of a user and/or a guide. For example, a guide may select a resource which is to be used to provide a search result responsive to a request, or a user may designate a preferred resource, etc. Using the example in FIG. 3, the resource 'Resource2' is associated with the request 'Request1.1' which may indicate that 'Resource2' has been utilized responsive to the request 'Request1.1'. For example, a resource which may perform an activity such as a transcription, a search, a categorization, or other activity responsive to a request may be indicated in the request resource ID field 340. Content of the request resource ID field 340 may be used to establish communication with a resource based on the content of a resource record such as the resource record 700 (FIG. 7). A resource may be selected based at least in part on information associated with a category, a profile and/or other information associated with a request and a resource. Information of a resource may be provided to a guide selected to respond to a request.

The request result ID field 345 may include an identifier of a result associated with a request. Content of the request result ID field 345 may be used to indicate a result associated with a request. A result may be associated with a request automatically. A result may be associated with a request based on actions of a user and/or a guide. Using the example in FIG. 3, the result 'Result1.1' is associated with the request 'Request1.1' which may indicate that 'Result1.1' has been provided to a user responsive to the request 'Request1.1'. Information of a result may be indicated in a result record such as the result record 1000 (FIG. 10).

The request location ID field 350 may include an identifier of a location associated with a request. Content of the request location ID field 350 may be used to indicate a location associated with a request. A location may be associated with a request automatically. For example, geographic information associated with a user device may be associated with a request. A location may be associated with a request based on actions of a user and/or a guide. For example, a location may be designated using a GUI, a text message, a voice message, etc. Using the example in FIG. 3, the location 'Indianapolis, Ind.' is associated with the request 'Request1.1'. Location information may be associated with GPS information, latitude and longitude, area code, or other types of geographic information which may be associated with a query. Location information may be indicated in a profile associated with a user as illustrated with respect to FIG. 5 and FIG. 9. Location information may be provided to a guide for example to assist in providing information responding to a request, etc.

In at least one embodiment, a request record is created responsive to receiving a request. A request record may include other fields, and any fields of a request record may be empty.

As illustrated in FIG. 4, an exemplary triggered request record 400 of which one or more may be associated with or resident in the search database 120 (FIG. 1) is provided. The triggered request record 400 may include a triggered request record ID field 405, a triggered request request ID field 410, a triggered request user ID field 415, a triggered request delivery info field 420, a triggered request location info field 425, a triggered request trigger condition field 430, and a triggered request status field 435.

The triggered request record ID field 405 contains an identifier of a triggered request, which is preferably unique and preferably used consistently. For example, in at least one embodiment, the triggered request record ID field 405 can include a randomly generated numerical code, and/or a string indicating a triggered request. A triggered request record ID serves to distinguish a triggered request record associated with a triggered request from a triggered request record associated with other triggered requests. Although particular examples of identifiers are described herein, other types of identifiers uniquely indicating a triggered request may be utilized without departing from the spirit and scope of the embodiments. In at least one embodiment, the triggered request record ID includes a telephone number. A triggered request record ID may include a username, an IM credential, an email address, etc. Using the example in FIG. 4, 'Triggered request1.1' is the triggered request record ID associated with the triggered request record 400.

The triggered request query ID field 410 may include information of a request associated with a triggered request. The triggered request query ID field 410 may indicate a search which is to be performed when a triggered request is activated. Using the example illustrated in FIG. 4, 'Request1.1' is associated with the triggered request 'Triggered Request1.1', which may indicate that 'Request1.1' is to be submitted to the search system 130 (FIG. 1) when 'Triggered request1.1' is activated. Although triggering of a previously submitted request is used for the purposes of illustration, a request indicated in the triggered request query ID field 410 is not restricted in any way. It may be any arbitrary request. While the triggered request query ID 410 is included in the record 400, the present invention is not limited to having particular types of information in a database. For example, content of a request may be included as part of the triggered request record 400. Further, profile information illustrated in FIG. 9 may also be linked with the triggered request record 400 where a triggered request is associated with one or more profiles.

The triggered request user ID field 415 may include an identifier of a user associated with a triggered request. Content of the triggered request user ID field 415 may be used to establish communication with a user based on content of a user record such as the user record 500 (FIG. 5). Using the example in FIG. 4, 'User1' is associated with the triggered request 'Triggered request1.1' which may indicate that 'User1' has submitted the triggered request 'Triggered request1.1'. While 'User1' is associated with 'Request1.1' and 'Triggered request1.1' it is envisioned that a user associated with a triggered request might not be associated with the request indicated in the triggered request query ID field 410. Any number of users may be indicated in the triggered request user ID field 415, and an original user who submitted a request indicated as a triggered request may or may not be associated with the triggered request. In at least one embodiment, multiple users may be associated with a triggered search request.

The triggered request delivery info field 420 may include delivery information associated with a triggered request. For example, information of a communication service and/or device associated with a user might be indicated in the triggered request delivery info field 420. If delivery information is associated with the request indicated in the triggered request request ID field 410, content of the triggered request delivery info field 420 may be used to supersede the information indicated by the triggered request request ID field 410. Using the example illustrated in FIG. 4, the information 'send text to user phone' and 'reminder=off' are associated with the triggered request 'Triggered request1.1', which may indicate a device to receive a search result, and that a reminder of a request is not to be sent to the device when the triggered request 'Triggered request1.1' is activated.

The triggered request location info field 425 may include location information associated with a triggered request. For example, information of a location associated with a user might be indicated in the triggered request location info field 425. If location information is associated with the request indicated in the triggered request request ID field 410, the content of the triggered request location info field 425 may supersede the information indicated. Using the example in FIG. 4, 'location=user device location' is associated with the triggered request 'Triggered request1.1', which may indicate that location information associated with a user device identified in the user request delivery info field 420 is to be used when the triggered request 'Triggered request1.1' is activated.

The triggered request trigger condition field 430 may include a trigger condition associated with a triggered request. For example, information of a date and/or time associated with a user might be indicated in the triggered request trigger condition field 430, or information of any other type of trigger event which may be available to the search system may be indicated. Trigger events may be associated with a keyword, a categorization, a profile, and/or other item associated with a triggered request. Using the example illustrated in FIG. 4, the information 'frequency=daily'; 'time=08.30EST' is associated with the triggered request 'Triggered request1:1', which may indicate that the request 'Request1.1' will be triggered daily at 8:30AM EST if 'Triggered request1.1' is active. It is important to note that apparently unrelated events may be used as triggers. For example, a user might request to know the weather in a location if there is a traffic jam, or to know the price of a gallon of gas if there is an earthquake. Although a specific example of a trigger condition is illustrated in FIG. 4, the present invention may be implemented using various types of condition(s) to trigger a request. For example, instead of triggering a request at a predefined time, a condition may be defined or set such that a request is triggered when a change occurs to previously provided information.

The triggered request status field 435 may include an indicator of a status associated with a triggered request. For example, a triggered request may be in an active, inactive, deleted, etc. A user may select the status of a triggered request. Using the example in FIG. 4, the triggered request 'Triggered request1.1' is indicated as 'Active' which may indicate that a search request will be initiated if a trigger condition indicated in the triggered request trigger condition field 430 is met. In at least one embodiment, the triggered request status field 435 and the triggered request user ID field 415 may be linked by for example a pointer, which may allow a different status to be applied to different users.

A category, keyword, profile, location, and/or other information may be associated with a triggered search request. For example, a category, keyword, profile, etc. associated with a request indicated in the triggered request request ID field 410 may be associated with a triggered request. A triggered search request may be ranked based on a category, keyword, and/or other items which may affect the probability that a triggered request will be presented. For example, if a user request is associated with a category, a triggered request which is frequently used which is associated with the category may be more likely to be presented as a suggested triggered query.

As illustrated in FIG. 5, an exemplary user record 500 is provided, of which one or more may be associated with or resident in the search database 120 (FIG. 1). The user record 500 may include a user ID field 505, a user profile ID field 510, a user request ID field 515, a user triggered request ID field 520, and a user communication info field 525.

The user ID field 505 preferably contains a unique identifier of a user, which is preferably used consistently. For example, in at least one embodiment, the user ID field 505 can include a randomly generated numerical code, and/or a text string indicating a name associated with a user. A user ID serves to distinguish a user record associated with a user from a user record associated with other users. Other unique identifiers of a user may be utilized without departing from the spirit and scope of the embodiments. In at least one embodiment, a user ID may include a phone number associated with a user. Using the example illustrated in FIG. 5, 'User1' is the user ID associated with the user record 500.

The user profile ID field 510 includes information of a profile associated with a user. Content of the user profile ID field 510 may be modified based on actions of a user. A person may select a profile which is associated with a user. For example, a user may select a profile to be associated with the user during a registration process. A profile may be associated with a user based on testing of a user. For example, a user may be required to demonstrate knowledge relevant to a profile in order to be associated with the profile, or a user may take a test which is used to generate a profile, or a user may provide information such as demographic, geographic, personality or other information which may be indicated in a profile associated with the user. A profile associated with a user may be used to select and/or rank a user for voting. Using the example illustrated in FIG. 5, the profiles 'DemoprofileU1', 'GeoprofileU1' and 'PersprofileU1' are associated with the user 'User1'. This may indicate that 'User1' has indicated and/or generated the profiles 'DemoprofileU1' which may be a demographic profile, 'GeoprofileU1' which may be a geographic profile and 'PersprofileU1' which might indicate personality information regarding the user 'User1'.

The user request ID field 515 includes information of a request associated with a user. Content of the user request ID field 515 may be modified based on actions of a user. If a user submits a search request to the search system 130 (FIG. 1) an identifier of the search request may be included in the user request ID field 515. Using the example illustrated in FIG. 5, the requests 'Request1.1', 'Request1.2' are associated with the user 'User1'. This may indicate that 'User1' has submitted the requests 'Request1.1' and 'Request1.2'.

The user triggered request ID field 520 includes information of a triggered request associated with a user. Content of the user triggered request ID field 520 may be modified based on actions of a user. Using the example illustrated in FIG. 5, the triggered requests 'Triggered request1.1' and 'Triggered request1.2' are associated with the user 'User1'. This may indicate that 'User1' has been associated with the triggered requests 'Triggered request1.1' and 'Triggered request1.2'. For example a user may have elected to receive a search result responsive to a triggered request, or a guide may have associated a user with a triggered request.

The user communication info field 525 includes information of a device and/or service associated with a user. Content of the user communication info field 525 may be modified based on actions of a user. If a user establishes communications with the search system using a device and/or service, information regarding the device and/or service may be included in the user communication info field 525. Any type of communication service and/or system may be indicated in the user communication info field 525. For example, a username and/or password associated with a user may be indicated in the user communication info field 525. Communication services such as Instant Messaging (IM), e-mail, SMS, MMS, EMS, telephone, wireless or wired communication, etc. may be indicated in the user communication info field 525. A telephone number, an email address, an IM provider and login ID, a keyword associated with a service, etc. may be indicated in the user communication info field 525. Using the example illustrated in FIG. 5, the login 'user1', the email 'user1@chacha.com', the twitter account 'twitter:user1' and the phone number '317.924.2242' are associated with the user 'User1'. This may indicate that 'User1' may be contacted using the login ID 'user1', via email at 'user1@chacha.com', via Twitter as 'user1' and via voice, text, or other service associated with the phone number '317.924.2242'. Further, a user may specify which of the communication service(s) should be used to deliver results responsive to a particular trigger request. For example, result of a first trigger request of a user may be delivered via text message while a second trigger request result of the same user may be sent via email to the user.

As illustrated in FIG. 6, an exemplary guide record 600 is provided, of which one or more may be associated with or resident in the search database 120 (FIG. 1). The guide record 600 may include a guide ID field 605, a guide category ID field 610, a guide profile ID field 615, a guide result ID field 620, a guide communication info field 625, and a guide request ID field 630.

The guide ID field 605 preferably contains a unique identifier of a guide, which is preferably used consistently. For example, in at least one embodiment, the guide ID field 605 can include a randomly generated numerical code, and/or a text string indicating a name associated with a guide. A guide ID serves to distinguish the guide record associated with a guide from a guide record associated with other guides. Other unique identifiers of a guide may be utilized without departing from the spirit and scope of the embodiments. Using the example illustrated in FIG. 6, 'Guide1' is the guide ID associated with the guide record 600.

The guide category ID field 610 includes information of a category associated with a guide. Content of the guide category ID field 610 may be modified based on actions of a guide. A person may select a category and/or keyword which is associated with a guide. A category may be associated with a guide based on testing of a guide. A category may be associated with a guide based on an affiliate group associated with a guide. For example, if a guide has chosen to be affiliated with affiliate groups associated with a type of music, a category associated with the type of music might be associated with the guide. A category associated with a guide may be used to select items which are to be presented to a guide. A guide may be selected to vote regarding an item based on the association of a guide with a category. A guide may be selected to respond to a request based at least in part on a category associated with a guide and a request. Using the example illustrated in FIG. 6, the categories 'Category1' and 'Category3' are associated with the guide 'Guide1'.

The guide profile ID field 615 includes information of a profile associated with a guide. Content of the guide profile ID field 615 may be modified based on actions of a guide. A person may select a profile which is associated with a guide. For example, a guide may select a profile to be associated with the guide during a registration process. A profile may be associated with a guide based on testing of a guide. For example, a guide may be required to demonstrate knowledge relevant to a profile in order to be associated with the profile, or a guide may take a test which is used to generate a profile, or a guide may provide information such as demographic, geographic, personality or other information which may be indicated in a profile associated with the guide. Information indicated in the content of the guide profile ID field 615 may be compared to information indicated in the content of a profile associated with a request in order to determine a ranking of a guide for responding to a request. Likewise, a profile associated with a guide may be used to select and/or rank a guide for voting. Using the example illustrated in FIG. 6, the profiles 'Demoprofileg1', 'Geoprofileg1' and 'Persprofileg1' are associated with the guide 'Guide1'. This may indicate that 'Guide1' has indicated and/or generated the profiles 'Demoprofileg1' which may be a demographic profile, 'Geoprofileg1' which may be a geographic profile and 'Persprofileg1' which might indicate personality information regarding the guide 'Guide1'.

The guide result ID field 620 includes information of a result associated with a guide. Content of the guide result ID field 620 may be modified based on actions of a guide. If a guide produces a search result responsive to a search request, an identifier of the search result may be included in the guide result ID field 620. A rating and/or ranking associated with a search result associated with a search result associated with a guide may affect compensation for a guide. Likewise a usage indicator associated with a search result provided by a guide may affect a rating and/or ranking associated with a guide. Using the example illustrated in FIG. 6, the results 'Result1.1' and 'Result5.2' are associated with the guide 'Guide1'. This may indicate that 'Guide1' has provided the results 'Result1.1' and 'Result5.2' responsive to a search request.

The guide communication info field 625 includes information of a device and/or service associated with a guide. Content of the guide communication info field 625 may be modified based on actions of a guide. If a guide establishes communications with the search system 130 using a device and/or service information regarding the device and/or service may be included in the guide communication info field 625. Any type of communication service and/or system may be indicated in the guide communication info field 625. For example, a username and/or password associated with a guide may be indicated in the guide communication info field 625. Communication services such as Instant Messaging (IM), e-mail, SMS, MMS, EMS, telephone, wireless or wired communication, etc. may be indicated in the guide communication info field 625. A telephone number, an email address, an IM provider and login ID, a keyword associated with a service, an IP address, a MAC address, etc. may be indicated in the guide communication info field 625. Using the example illustrated in FIG. 6, the login 'guide1', the email 'guide1@chacha.com', the IM credential 'guide1@AIM' and the phone number '317.224.2242' are associated with the guide 'Guide1'. This may indicate that 'Guide1' may be contacted using the login ID 'guide1', via email at 'guide1@chacha.com', via IM as 'guide1@AIM' and via voice, text, or other service associated with the phone number '317.224.2242'.

The guide request ID field 630 includes information of a request associated with a guide. The content of the guide request ID field 630 may be modified based on actions of a guide. If a guide produces a search result responsive to a search request, an identifier of the search request may be included in the guide request ID field 630. A rating and/or ranking associated with a search request associated with a guide may affect compensation for a guide. Likewise a usage indicator associated with a search request and a guide may affect a rating or ranking associated with the guide. A request may be associated with a guide based on a vote cast by a guide regarding items associated with the search request. Using the example illustrated in FIG. 6, the requests 'Request1.1', 'Request3.2' and 'Request5.4' are associated with the guide 'Guide1'. This may indicate that 'Guide1' has responded to, been selected to respond to, and/or has voted regarding one or more item associated with the requests 'Request1.1', 'Request3.2' and 'Request5.4'. A guide and a user may establish communications based on the association of a guide and a user with a request.

As illustrated in FIG. 7, an exemplary resource record 700 is provided, of which one or more may be associated with or resident in the search database 70 (FIG. 1). The resource record 700 may include a resource ID field 705, a resource guide ID field 710, a resource description field 715, a resource access info field 720, a resource category ID field 725 and a resource usage information field 730.

The resource ID field 705 preferably contains a unique identifier of a resource, which is preferably used consistently. For example, in at least one embodiment, the resource ID field 705 can include a randomly generated numerical code, and/or a text string indicating a name associated with a resource. A resource ID serves to distinguish the resource record associated with a resource from a resource record associated with other resources. Other unique identifiers of a resource may be utilized without departing from the spirit and scope of the embodiments. In at least one embodiment, a resource ID may include a description associated with a resource. Using the example illustrated in FIG. 7, 'Resource4' is the resource ID associated with the resource record 700.

The resource guide ID field 710 may include information of a guide associated with a resource. For example, a guide who utilized a search resource may be indicated in the resource guide ID field 710. In at least one embodiment a guide ID associated with a guide who has voted regarding a resource may be indicated in the resource guide ID field 710. Information contained in the resource guide ID field 710 may be used to obtain information regarding a guide associated with a search resource based on records such as the guide record 600 (FIG. 6). Using the example illustrated in FIG. 7, the guide ID 'Guide1', 'Guide2' and 'Guide3' are associated with the resource 'Resource4' which may indicate that 'Guide1', 'Guide2' and 'Guide3' have accessed the search resource 'Resource4'.

The resource description field 715 may include information of a description of a search resource. For example, a text snippet associated with a search resource may be indicated in the resource description field 715. A URL or other information associated with a search resource may be indicated in the resource description field 715. Information contained in the resource description field 715 may be used to provide a description of search resource. Using the example illustrated in FIG. 7, the text snippet 'weather chacha' is associated with the resource 'Resource4'.

The resource access info field 720 may include access information associated with a search resource. For example, a URL associated with a web page may be indicated in the resource access info field 720. A password, a login ID, a template for submitting a search query, an API for submitting and receiving information and/or any other information which may be utilized to access a search resource may be indicated in the resource access info field 720. Information contained in the resource access info field 720 may be used to provide access to a search resource for a guide, a user and/or the search system 130 (FIG. 1). Using the example illustrated in FIG. 7, the URL template <http://autoguides.chacha.com/weatherResults.aspx?zip=location>' is the access information associated with the resource 'Resource4'. This may for example indicate that a search result may be obtained using <http://autoguides.chacha.com/weatherResults.aspx?zip=location> wherein 'location' is location information associated with a request.

The resource category ID field 725 may include information regarding a category associated with a search resource. For example, a category may be used to select a resource for a purpose such as producing a search result, being reviewed by guides, being provided to a guide and/or a user, etc. may be indicated in the resource category ID field 725. Using the example illustrated in FIG. 7, 'Category1' and 'Category3' are associated with the resource 'Resource4'. This may indicate that the resource 'Resource4' has been designated as a resource which may be utilized by a guide and/or the search system 130 to obtain a search result associated with the category 'Category1' and 'Category3'. Information in the resource category ID field 725 may be utilized at least in part to determine whether a search resource is to be provided to a guide and/or a ranking and/or rating associated with a resource, etc.

The resource usage information field 730 may include information regarding use of a search resource. For example, a number of times that a search resource has been utilized by a guide may be indicated in the resource usage information field 730, or a percentage of use of a resource by guides responding to a request associated with a category may be indicated. Using the example illustrated in FIG. 7, the indicators '90%' and '60%' are associated with the resource 'Resource4'. This may indicate that the resource 'Resource4' has been utilized by ninety percent of guides associated with the category 'Category1' and sixty percent of guides associated with the category 'Category3'. Information in the resource usage information field 730 may be utilized to determine whether a search resource is to be reviewed, a ranking and/or rating associated with a resource, compensation, etc.

As illustrated in FIG. 8, an exemplary a category record 800 is provided, of which one or more may be associated with or resident in the search database 120 (FIG. 1). The category record 800 may include a category ID field 805, a category description field 810, a category guide ID field 815, a category guide rating field 820, a category resource ID field 825, and a category resource rating field 830.

A category record may be used to track a rating of items associated with taxonomy applied to requests or search queries and/or other information provided in associated therewith. In at least one embodiment, a category associated with a request may be used at least in part to select an item responsive to the request. For example, a guide, a resource, a result, an advertisement, etc. may have a rating associated with a category which may be used to rank the items which may affect the probability of selecting the item. A category may be ranked relative to an item. For example, if a keyword is associated with a category, and the keyword is associated with content of a request, a rating of the category associated with the keyword may affect the ranking of the category associated with the request.

The category ID field 805 preferably contains a unique identifier of a category, which is preferably used consistently. For example, in at least one embodiment, the category ID field 805 can include a randomly generated numerical code, and/or a text string. A category ID serves to distinguish the category record associated with a category from a category record associated with other categories. Other unique identifiers of a category may be utilized without departing from the spirit and scope of the embodiments. As illustrated in FIG. 8, 'Category1' is the category ID associated with the category record 800.

The category description field 810 includes information of a description associated with a category. For example, text associated with a category may be indicated in the category description field 810. Such information may be used to assist a guide in associating a search request with a category. In at least one embodiment, a description of a category and other item associated with a category may be presented to a guide in order to allow a guide to indicate a preferred item. For example, an advertisement, a search resource, etc. may be presented to a guide associated with a category in order that a guide may vote regarding the advertisement, the search resource, etc. As illustrated in FIG. 8, 'Local>Weather' is the category description associated with the category 'Category1'.

The category guide ID field 815 includes information of a guide who is associated with a category. For example, if a guide elects to receive search requests associated with the category 'Category1', an identifier of the guide may be indicated in the category guide ID field 815. Information indicated in the category guide ID field 815 may be used to obtain information associated with a guide using a record such as the guide record 600 (FIG. 6). Using the example illustrated in FIG. 8 'Guide1', 'Guide2', and 'GuideN' have been associated with the category 'Category1'.

The category guide rating field 820 includes information regarding a rating of a guide associated with a category. In at least one embodiment, the category guide ID field 815 and the category guide rating field 820 are linked by for example a pointer. Using the example illustrated in FIG. 8, the guide 'Guide1' has a rating of '10', the guide 'Guide2' has a rating of '6', and the guide 'GuideN' has a rating of '2' with respect to 'Category1'. Content of the category guide ID field 815 and the category guide rating field 820 may be used at least in part to determine an order in which a guide are notified responsive to a search request, a voting activity, or other types of tasks and/or activities associated with a category. Using the example illustrated in FIG. 8, the guide 'Guide1' might be preferentially notified of a request associated with the category 'Category1'.

The category resource ID field 825 includes information of a resource associated with a category. For example, if a guide utilizes a resource to respond to a search request associated with the category 'Category1', an identifier of the resource may be indicated in the category resource ID field 825. Information indicated in the category resource ID field 825 may be used to obtain information associated with a resource using a record such as the resource record 700 (FIG. 7). Using the example illustrated in FIG. 8 'Resource1', 'Resource2', and 'ResourceN' have been associated with the category 'Category1'.

The category resource rating field 830 includes information regarding a rating of a resource associated with a category. In at least one embodiment, the category resource ID field 825 and the category resource rating field 830 are linked by for example a pointer. Using the example illustrated in FIG. 8, the resource 'Resource1' has a rating of '8', the resource 'Resource2' has a rating of '8.5', and the resource 'ResourceN' has a rating of '3'. The content of the category resource ID field 825 and the category resource rating field 830 may be used at least in part to determine an order in which a search resource are presented and/or utilized responsive to a request associated with a category. Using the example illustrated in FIG. 8, the resource 'Resource2' might be preferentially presented to a guide associated with the category 'Category1'.

Rating information of a guide, an advertisement, a search resource, and other information and/or item associated with a category may be based at least in part on votes of guides associated with the category, but may be based on any information indicated in the database 120 (FIG. 1).

As illustrated in FIG. 9, an exemplary profile record 900 is provided, of which one or more may be associated with or resident in the search database 120 (FIG. 1). The profile record 900 may include a profile ID field 905, a profile geographic info field 910, a profile demographic info field 915, a profile personality info field 920, a profile guide ID 925 and a profile guide rating 930.

The profile ID field 905 preferably contains a unique identifier of a profile, which is preferably used consistently. For example, in at least one embodiment, the profile ID field 905 can include a randomly generated numerical code, and/or a text string indicating a name associated with a profile. A profile ID serves to distinguish a profile record associated with a profile from a profile record associated with other profiles. Other unique identifiers of a profile may be utilized without departing from the spirit and scope of the embodiments. In at least one embodiment, a profile ID may include a description associated with a profile. Using the example illustrated in FIG. 9, 'Profile1' is the profile ID associated with the profile record 900.

The profile geographic info field 910 may include geographic information associated with a profile. Any type of geographic information may be indicated in the profile geographic info field 910. For example, GPS coordinates, a street address, a neighborhood name, a postal code, a city name, a state name, etc. could be indicated in the profile geographic info field 910. Using the example illustrated in FIG. 9, the name 'Indiana' is associated with the profile 'Profile1'. This may indicate that guides and/or users with home addresses in the state of 'Indiana' may have a higher rating and/or ranking with respect to the profile 'Profile1'.

The profile demographic info field 915 may include demographic information associated with a profile. Any type of demographic information may be indicated in the profile demographic info field 915. For example, date of birth, sex, race, political affiliation, income, number of children, marital status, membership in organizations, etc. could be indicated in the profile demographic info field 915. Using the example illustrated in FIG. 9, the profile 'under30'AND'over20' is associated with the profile 'Profile1'. This may indicate that guides and/or users with ages greater than 20 years and less than 30 years may have a higher rating and/or ranking with respect to the profile 'Profile1'.

The profile personality info field 920 may include personality information associated with a profile. Any type of personality information may be indicated in the profile personality info field 920. For example, information of personality traits such as aggressiveness, curiosity, friendliness, intelligence, honesty, interests, political affiliations, memberships, etc. could be indicated in the profile personality info field 920.

Using the example illustrated in FIG. 9, the profile 'Foodie' is associated with the profile 'Profile1'. This may indicate that guides and/or users with an interest in food and restaurants may have a higher rating and/or ranking with respect to the profile 'Profile1'.

The profile guide ID field 925 includes information of a guide who is associated with a profile. For example, if a guide elects to receive search requests associated with the profile 'Profile1', an identifier of the guide may be indicated in the profile guide ID field 925. Information indicated in the profile guide ID field may be used to obtain information associated with a guide using a record such as the guide record 700 (FIG. 7). Using the example illustrated in FIG. 9 'Guide1', 'Guide3', 'Guide2', 'Guide4' and 'Guide5' have been associated with the profile 'Profile1'.

The profile guide rating field 930 includes information regarding a rating of a guide associated with a profile. In at least one embodiment, the profile guide ID field 925 and the profile guide rating field 930 are linked by for example a pointer. Using the example illustrated in FIG. 9, 'Guide1' has a rating of '2', 'Guide3' has a rating of '2', 'Guide2' has a rating of '1', 'Guide4' has a rating of '3' and 'Guide5' has a rating of '3'. Content of the profile guide ID field 925 and the profile guide rating field 930 may be used at least in part to determine an order in which a guide are notified responsive to a search request, a voting activity, and/or other types of tasks and/or activities associated with a profile. Using the example illustrated in FIG. 9, the guide 'Guide2' might be preferentially notified of a search request associated with the profile 'Profile1'. A guide rating associated with a profile may be determined based on any suitable calculations.

As illustrated in FIG. 10, an exemplary result record 1000 is provided, of which one or more may be associated with or resident in the search database 120 (FIG. 1). The result record 1000 may include a result ID field 1005, a result guide ID field 1010, a result content info field 1015, and a result resource ID field 1020.

The result ID field 1005 preferably contains a unique identifier of a result, which is preferably used consistently. For example, in at least one embodiment, the result ID field 1005 can include a randomly generated numerical code, and/or a text string indicating a name associated with a result. A result ID serves to distinguish the result record associated with a result from a result record associated with other results. Other unique identifiers of a result may be utilized without departing from the spirit and scope of the embodiments. In at least one embodiment, a result ID may include a description associated with a result. Using the example illustrated in FIG. 10, 'Result1.1' is the result ID associated with the result record 1000.

The result guide ID field 1010 may include information of a guide associated with a result. For example, a guide who obtained a search result may be indicated in the result guide ID field 1010. In at least one embodiment a guide ID associated with a guide who have voted on a result may be indicated in the result guide ID field 1010. Information contained in the result guide ID field 1010 may be used to obtain information regarding a guide associated with a search result based on records such as the guide record 700 (FIG. 7). Using the example illustrated in FIG. 10, the guide ID 'Guide1' is associated with the result 'Result1.1' which may indicate that the guide 'Guide1' has provided the search result 'Result1.1'.

The result content info field 1015 may include information of content of a search result. For example, a text snippet associated with a search result may be indicated in the result content info field 1015. A URL and/or other information associated with a search result may be indicated in the result content info field 1015. Information contained in the result content info field 1015 may be used to provide a search result to a user and/or a guide. Using the example illustrated in FIG. 10, the text snippet 'Indianapolis, Ind. 82 F Fair Today: HI/87 LOW/64 Sunny Tomorrow: HI/90 LOW/66 Sunny' is associated with the result 'Result1.1'. This may indicate that the text snippet may be provided to a user when the result 'Result1.1' is selected to be presented to a user.

The result resource ID field 1020 may include information of a search resource associated with a search result. For example, a URL associated with a web page from which a text snippet was obtained may be indicated in the result resource ID field 1020. A URL and/or other information such as a search query and/or a macro instruction associated with a search resource may be indicated in the result resource ID field 1020. Information contained in the result resource ID field 1020 may be used to provide access to a search resource for a guide and/or the system 100 (FIG. 1). Using the example illustrated in FIG. 10, 'Resource4' is the resource ID associated with the result 'Result1.1'. This may indicate that the resource 'Resource4' was used to obtain the search result 'Result1.1'.

Figure 11:
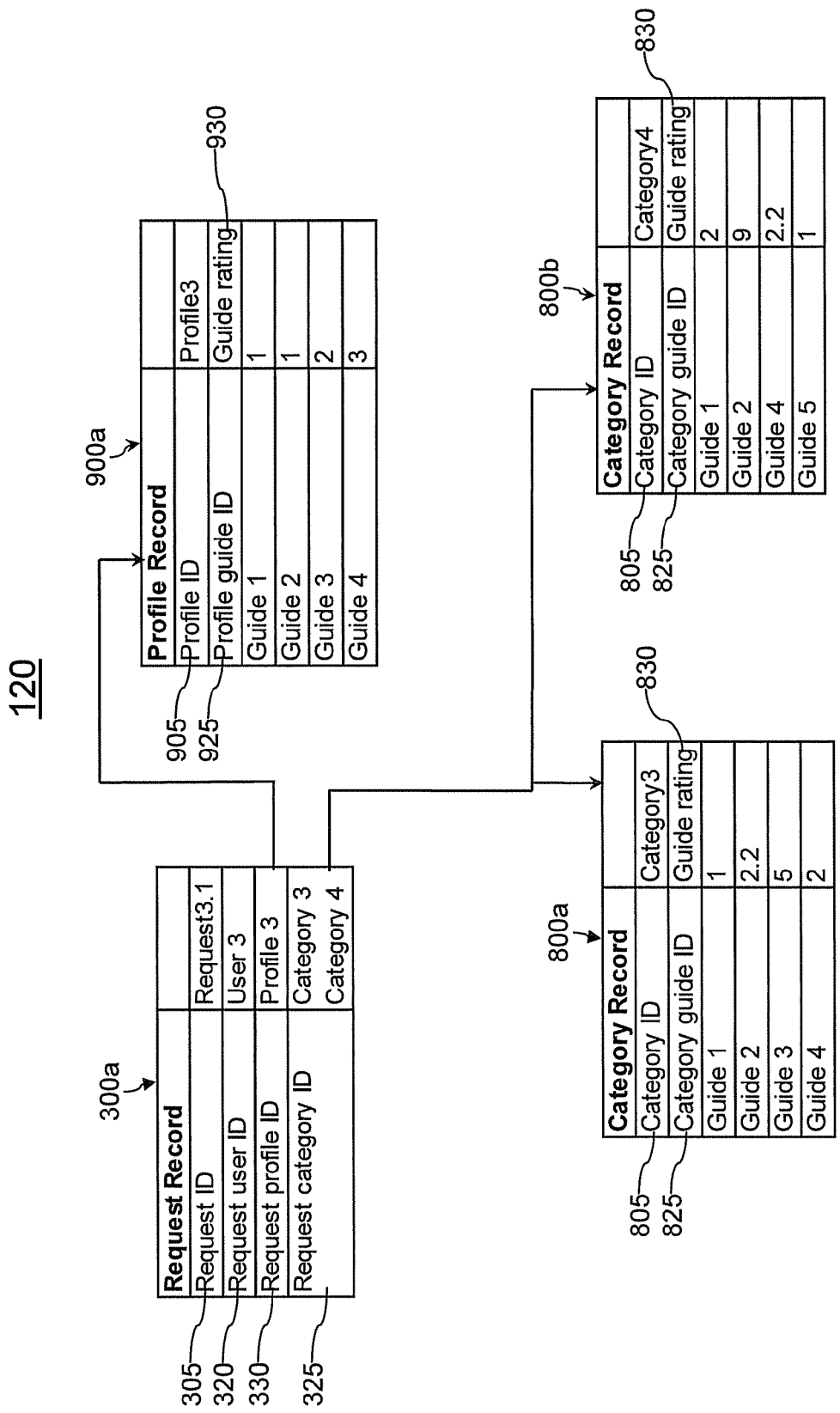
FIG. 11 illustrates selection of a guide.

FIG. 11 illustrates a selection of any item indicated by the database 120. A record associated with a guide, a user, an advertisement, a search result, a search resource, a profile, and/or any other record may be selected as illustrated in FIG. 11. The example of ranking and selection of a search result based on keywords, a profile, and categories is used for the purpose of illustration. No limitation is implied thereby. Any number of records and any type of rating, identifiers, and information which may be indicated in a record may be utilized within the scope of the embodiments herein.

As illustrated in FIG. 11, a request record 300*a* is created. The request record 300*a* may include information which indicates a request, a user ID, a profile, and a category which are associated with a search request indicated in the request record 300*a*. If it is determined that a guide is to be selected responsive to a request (i.e. 'Request3.1') as indicated in the request ID field 305, available guides may be ranked based on ratings of a guide associated with the profiles and categories associated with the request. A guide indicated by a guide ID may have a rating associated with a number of categories, profiles, etc. as indicated by a category record, a profile record, etc. As illustrated, 'Request3.1' is associated with 'User 3' as indicated in the request user ID field 320 of the request record 300*a*. The categories 'Category3' and 'Category4' are associated with 'Request3.1' as indicated in the request category ID field 325, The profile 'Profile3' is associated with 'Request3.1' as indicated in the request profile ID field 330, A guide may or may not have a rating associated with any or all of the items associated with a search request. For example, the guide 'Guide5' has no rating associated with 'Profile3' or 'Category3' while the guide 'Guide1' has a rating associated with 'Profile3', 'Category3' and 'Category4'.

In order to select an item such as a guide to be associated with a target item such as a search request, a formula may be applied which computes a rating and/or ranking of an item based on any or all information associated with the target item. For example, the guides 'Guide1', 'Guide2','Guide4' and 'Guide5' might be selected for and/or notified of the request 'Request 3.1' based on ratings associated with 'Category4'. Alternately, an item might be selected based on a ranking which includes ratings associated with more than one item associated with a target item. For example, a guide might be ranked based on rating information associated with the profile 'Profile3', and the categories 'Category3' and 'Category4'

The content of the profile record 900*a* is associated with 'Profile3' as indicated in the profile ID field 905. The profile guide ID field 925 includes information of guides associated with 'Profile3', and rating information associated with the guides as indicated in the profile guide rating field 930. The content of the category record 800*a* is associated with 'Category3' as indicated in the category ID field 805. The category guide ID field 815 includes information of guides associated with 'Category3', and rating information associated with the guides as indicated in the category guide rating field 820. Likewise, the content of the category record 800*b* is associated with 'Category4' as indicated in the category ID field 805. The category guide ID field 815 includes information of guides associated with 'Category4', and rating information associated with the guides as indicated in the category guide rating field 820.

Ratings associated with a guide associated with 'Profile1', 'Category3' and 'Category4' may be combined to determine a selection preference for a guide to respond to a the search request 'Request3.1' For example, guides might be selected based a lowest rating associated with 'Profile4' and then on the total rating associated with any categories associated with a search request. Such a process might for example be used to select a guide based more on similarity to a profile, and then on knowledge of a subject matter of a request. Using the example illustrated in FIG. 11, 'Guide2' would be ranked first (profile rating=1, total category rating=11.2), 'Guide1' would be ranked second ((profile rating=1, total category rating=3), 'Guide3' would be ranked third (profile rating=2, total category rating=5), 'Guide4' would be ranked fourth (profile rating=3, total category rating=4.2), and 'Guide5' would be ranked fifth (profile rating=none, total category rating=1).

Other techniques of computing a rating and/or ranking of an item in order to select an item to be associated with a target item will readily occur to one of ordinary skill in the relevant art. While the selection activity in FIG. 11 has been illustrated with a limited number of records, and limited types of items or records, any number of records and any types of information may be used in order to select an item to be associated with a target item. For example, a guide, a search result, an advertisement, a search resource, a category, etc. may be selected to be associated with a search request using the selection of items illustrated in FIG. 11. Likewise, the selection process may be applied recursively and/or to multiple types of records and/or items. For example, a keyword associated with a search request might be used to select one or more categories, and categories associated with a search request might be used to select a guide to be associated with a search request. The selection in FIG. 11 is not limited to any particular type of records and/or information.

While the relationships in the search database 120 have been depicted using a limited number of user, guide, result, resource, category, and request records, any number of records required to operate the embodiments may be utilized by the search system 130.

A user record, a guide record, a result record, a resource record, a keyword record, a category record and/or a request record may include additional fields and any field may be blank. For example, a user record may include information which may be used to provide payment to the search system 130, information which may be used to select a guide, a search result, a resource, and/or other information, etc. Likewise, a guide record may include information which may be used to provide compensation to a guide, information which may be used to select a guide, a search result, an advertisement, a resource, a keyword, a category and/or other information, etc. Similarly, a result record may include information regarding delivery of a result, a provider of a result, etc., and, a category record may include information of a keyword, a guide, a user, a search resource, etc. which may be associated with a category.

While the selection of a guide and/or search result and/or resource has been illustrated using a particular data structure, other equivalent types of data structures may be used within the scope of the embodiments described herein. Selection of an item is not limited to the particular examples illustrated herein. One of ordinary skill in the relevant art will immediately recognize that other selection criteria and mechanisms may be utilized within the spirit and scope of the embodiments herein.

In at least one embodiment, historical information may be utilized to select a guide and/or a resource and/or a search result. For example, if a user previously submitted a search request for information regarding restaurants, and was provided with one or more search result relating to the request, a guide and/or a search resource associated with information associated with a previous search request may be more likely to be selected. Likewise, if a user previously received a result associated with a request, the result may be less likely to be selected. In at least one embodiment, a guide and/or other item may be selected based at least in part on information associated with a search request which was submitted in response to an alert or result which was delivered to a user responsive to a triggered request.

Figure 12:
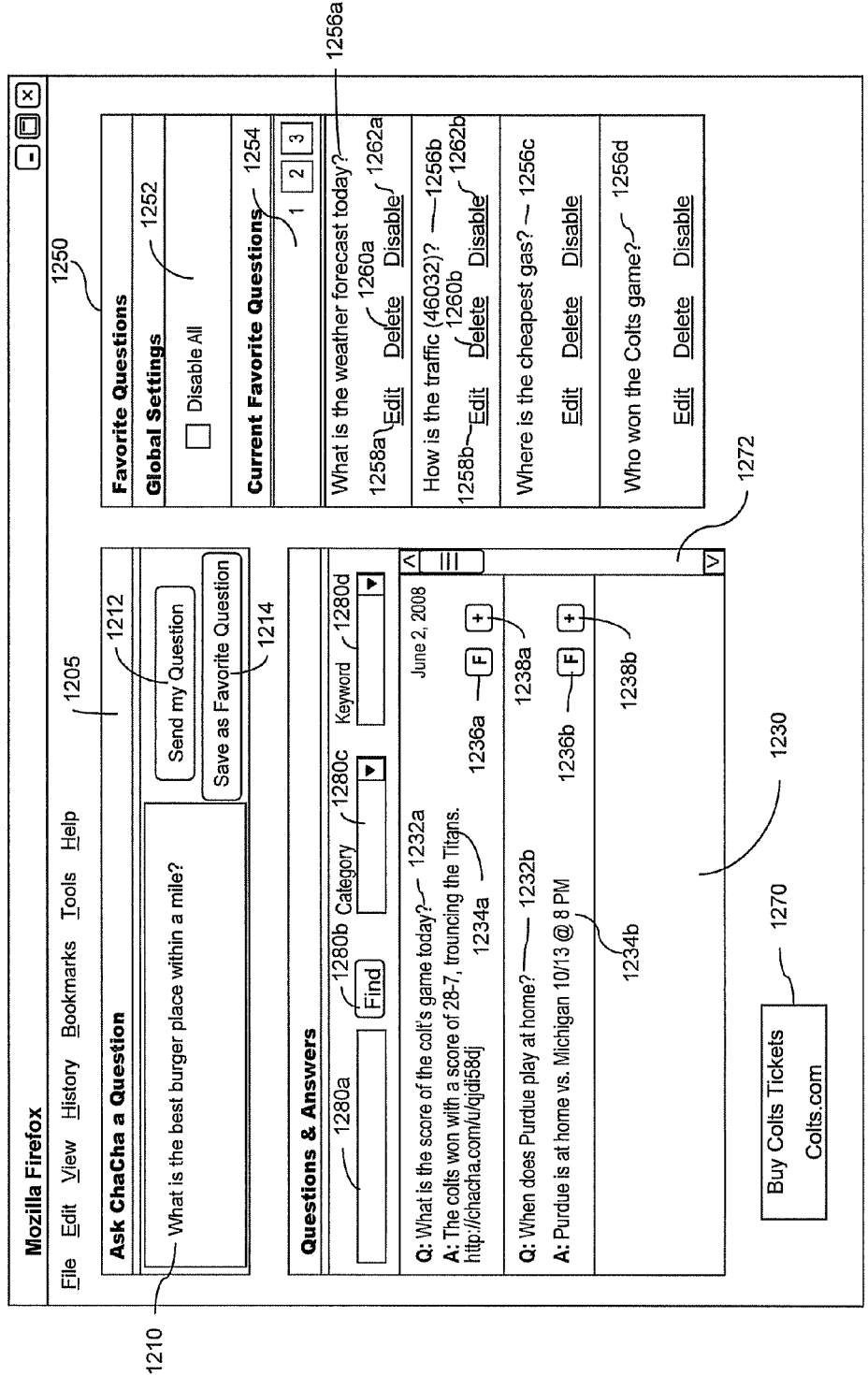
FIG. 12 illustrates a graphical user interface (GUI) for reviewing historical requests.

An exemplary graphical user interface 1200 to create and manage 'favorite' or triggered quer(ies) is illustrated in FIG. 12. The query management GUI 1200 may be used to create and manage triggered queries which may cause a search result to be provided.

As illustrated in FIG. 12, the query management GUI 1200 may include a query submission window 1205, a historical query management window 1230, a favorite query management window 1250, and an advertising window 1260.

The query submission window 1205 may include a query box 1210 which may be used to indicate information of a query, a query submission button 1212 which may be used to submit information indicated in the query box 1210 for a search, and a favorite query submission button 1214 which may be used to submit information indicated in the query box 1210 for a search and/or may cause the triggered request creation GUI 1300 (FIG. 13) to be presented. While a text query is used for the purposes of illustration, any type of information relating to a request such as audio, video, images, etc. may be indicated in the query box 1210. While submission of a query or request as favorite is illustrated using the button 1214 such as illustrated in FIG. 12, the present invention is not limited to any particular way of submission. For example, upon submission of a request by a user, a searcher or guide may respond to the request by providing data related thereto and prompt the user to verify whether the request should be saved as a favorite in relation to the user.

The query submission window 1205 may be used to input any type of query and may relate to any subject matter. For example, a user may submit a request regarding a price of a product and/or service provided by a vendor, designate the request as favorite and be updated if and when the price changes. Accordingly, the request or query may be of a subject matter arbitrarily selected or identified by a user The historical query management window 1230 may include a previous query indicator 1232 which may indicate the content of a previous query, a previous search result indicator 1234 which may indicate a search result associated with a previous query, a favorite query creation control 1236, a query expansion control 1238, and query filter controls 1240. Activating the query expansion control 1238 may cause more details of a response to a previous request to be presented. Activating the favorite query creation control 1236 may cause the GUI 1400 (FIG. 14) to be presented. The query filter controls 1240 may be used to select a query. A user may select a query from the search system database 120 (FIG. 1) using the query filter controls 1240. FIG. 12 shows queries associated with a user being presented in chronological order. However, any type of filtering controls may be provided. For example, a user might be able to select most recent queries associated with a category, a tag, a keyword, etc. using the query filter controls 1240. Likewise, a user might search for queries associated with keywords entered in the search box. Similarly, the historical query management window 1230 may present information of queries associated with a query indicated in the query box 1210.

The existing favorite query management window 1250 may include batch favorite query option controls 1252, existing favorite query filter controls 1254, favorite query indicators 1256, and favorite query action controls 1258. The batch favorite query option controls 1252 may be used to change the status of multiple favorite queries. The 'Disable All' control 1252 may cause a group of triggered requests to be set to inactive status by changing the state of the checkbox indicator. A group might include all triggered search requests, and/or a group of triggered search requests selected using the existing favorite query filter controls 1254. The existing favorite query filter controls 1254 may be used to select any or all existing favorite queries. For example, the '1', '2', '3' indicators may display a page with a number of triggered search request indicators 1256. Alternately, a user might be provided with the ability to select groups of favorite search queries according to criteria such as active/inactive, queries associated with a category, queries associated with a keyword, tag or any other organizational paradigm as is well known in the art.

The favorite query indicator controls 1256 may indicate content of a 'favorite' or triggered query. For example, the favorite query indicator control 1256a is associated with the query 'what is the weather forecast today?', the favorite query indicator control 1256b is associated with the query 'how is the traffic (46032)?', the favorite query indicator control 1256c is associated with the query 'where is the cheapest gas?' and the favorite query indicator control 1256d is associated with the query 'who won the Colts game?'.

Favorite query action controls 1258, 1260, and 1262 may be used to change the status of a triggered search query. For example, the favorite query action control 1258a may be used to change the status of the triggered search query 'what is the weather forecast today?', and the favorite query action control 1258b may be used to change the status of the triggered search query 'how is the traffic (46032)?', etc. The 'disable' control 1260a may be used to disable the query associated with the favorite query action control 1256a, the 'delete' control 1262a may be used to delete the query associated with the favorite query action control 1256a, and the 'edit' control 1264a may cause the GUI 1500 (FIG. 15) to be presented associated with the action control 1256a. Other types of controls might be added to the favorite query action controls such as a 'tag' control to cause a tag to be associated with a favorite query, a 'share' control to allow a user to send a favorite to another user, etc.

An advertising window 1270 may present an advertisement. Any sort of information may be provided as an advertisement including audio, images, text, etc. Information in the advertising window 1270 may be selected based on any information indicated in the search database 120 (FIG. 1). Content of favorite queries and/or search result associated with a favorite query may be used to select advertisements, or other types of information which may be presented in the advertising window 1270. Any number of advertising windows 1270 may be included in the GUI 1200.

Query filtering controls 1280 may be provided. The historical query filtering controls 1280 may be used to select a query. For example, a use may select previous queries associated with a user, a keyword, a search phrase, a category, etc. The phrase box 1280*a* may be used to indicate a phrase to be used to filter queries. The find control 1280*b* may be used to execute a search based on information indicated in the phrase box 1280*a*. The category filter 1280*c* may be a drop-down list, or typing box which allows a user to select queries associated with a category. The keyword filter 1280*d* may allow a user to select queries associated with a keyword. Any number of query filtering controls 1280 may be provided as needed to operate the embodiments. The scrolling controls 1272 may be used to navigate within content of the historical query management window 1230.

Figure 13:
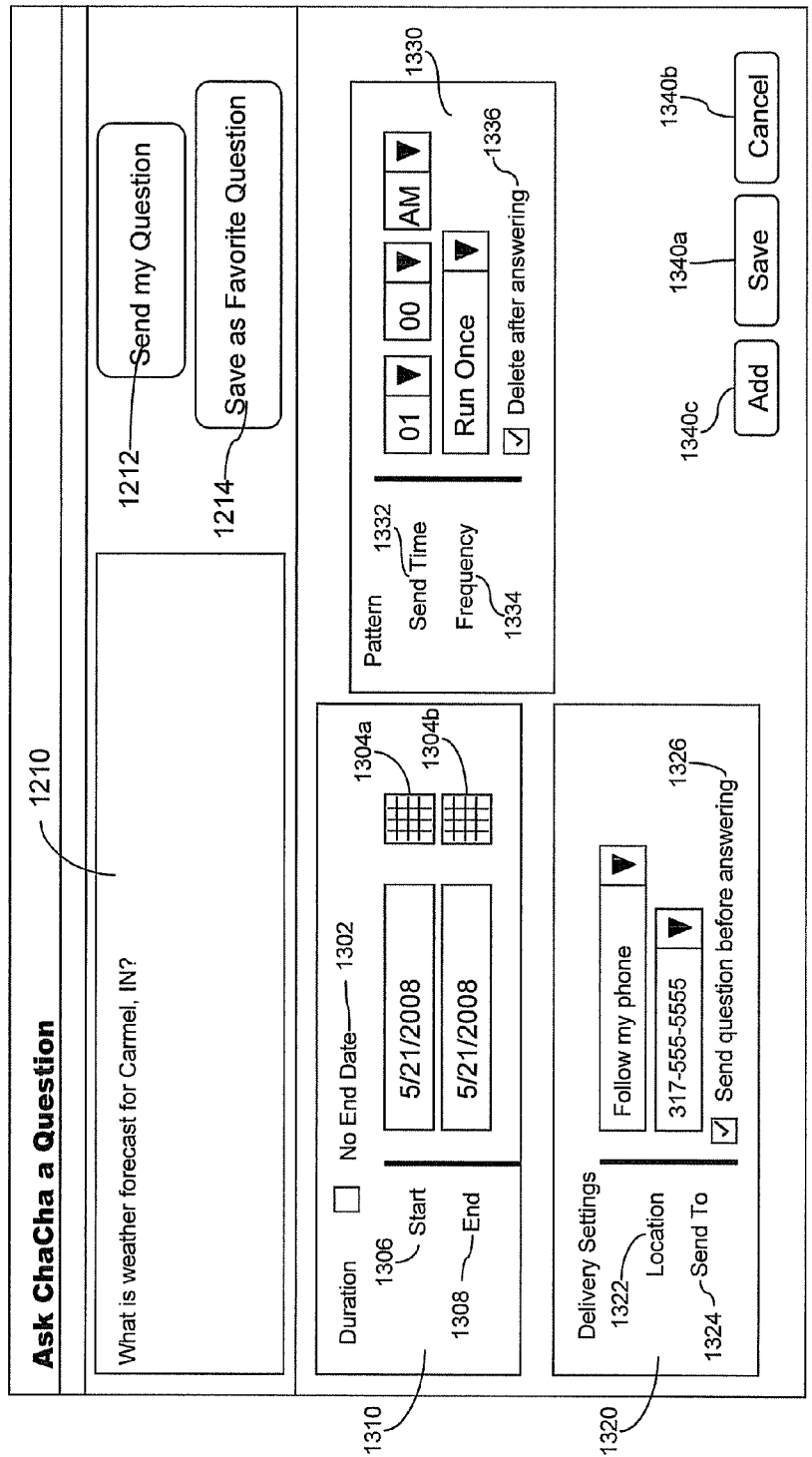
FIG. 13 illustrates a GUI for associating a trigger with a request.

An exemplary graphical user interface to create and manage a favorite or triggered query is illustrated in FIG. 13. The query management GUI 1300 may be used to create and/or manage triggered queries which may cause a search result to be provided.

The GUI 1300 may include duration controls 1310, delivery controls 1320, pattern controls 1330 and action buttons 1340. The duration controls 1310 may be used to indicate a time period during which a triggered search request is active. The delivery controls 1320 may be used to indicate how a search result is delivered to a user. The pattern controls 1330 may be used to determine a trigger event associated with a triggered search request.

The duration controls 1310 may include an infinite duration control 1302, a start date control 1306, an end date control 1308, and calendar selection controls 1304. The infinite duration control 1302 may be used to indicate whether an end date is to be associated with a favorite query. Activating or deactivating the check box in the infinite duration control 1302 may cause the end date for a triggered search request to be ignored. The start date control 1306 may be used to indicate a start date for a triggered search request. The end date control 1308 may be used to indicate an end date for a triggered search request. The calendar control 1304*a* may cause a calendar pop-up 1602 (FIG. 16) to be provided for the start date associated with a triggered search request. The calendar control 1304*b* may cause the calendar pop-up 1602 (FIG. 16) to be provided for the end date associated with a triggered search request.

The delivery controls 1320 may include a location indicator 1322, and a service delivery indicator 1324, and a query reminder control 1326. The location indicator 1322 may be used to indicate a location which may be associated with a triggered search request. For example, if a location associated with a request may affect a ranking of a result, the location associated with a request may be indicated using the location indicator 1322. The content of the location indicator 1322 may default to a location designated in a user profile. Activation of the location indicator 1322 drop-down list may cause a GUI such as the selection GUI 1610 (FIG. 16) to be provided. The service delivery indicator 1324 may be used to indicate a communication service which may be used to provide a search result associated with a triggered search request to a user. Content of the delivery indicator 1324 may default to information indicated in a user profile. Activation of the service delivery indicator 1324 may cause a GUI such as the entry box 1620 and selection control 1622 (FIG. 16) to be provided. The query reminder control 1326 may be used to activate or deactivate delivery of a reminder message which may include content of a triggered request by for example activating or deactivating a 'check-box'.

The pattern controls 1330 may include a delivery time indicator 1332, a delivery frequency indicator 1334, and an auto delete indicator 1336. The delivery time indicator 1332 may be used to designate a time at which a triggered search request is to be submitted. The frequency indicator 1324 may be used to indicate a frequency at which a triggered request is to be submitted, for example, a 'drop-down' list of options may cause controls such as the day selection controls 1632 (FIG. 16) to be provided based on an option elected. The auto delete indicator 1336 may be used to indicate whether a triggered request is to be deleted after execution by activating or deactivating the 'check-box'.

A 'Save' action button 1340*a* may be used to record changes to a triggered request. A 'Cancel' action 1340*b* may be used to close the GUI 1300 without recording changes made to a triggered request. An 'Add' action button 1340*c* may be used to save a modified triggered search request as a new triggered search request.

Figure 14:
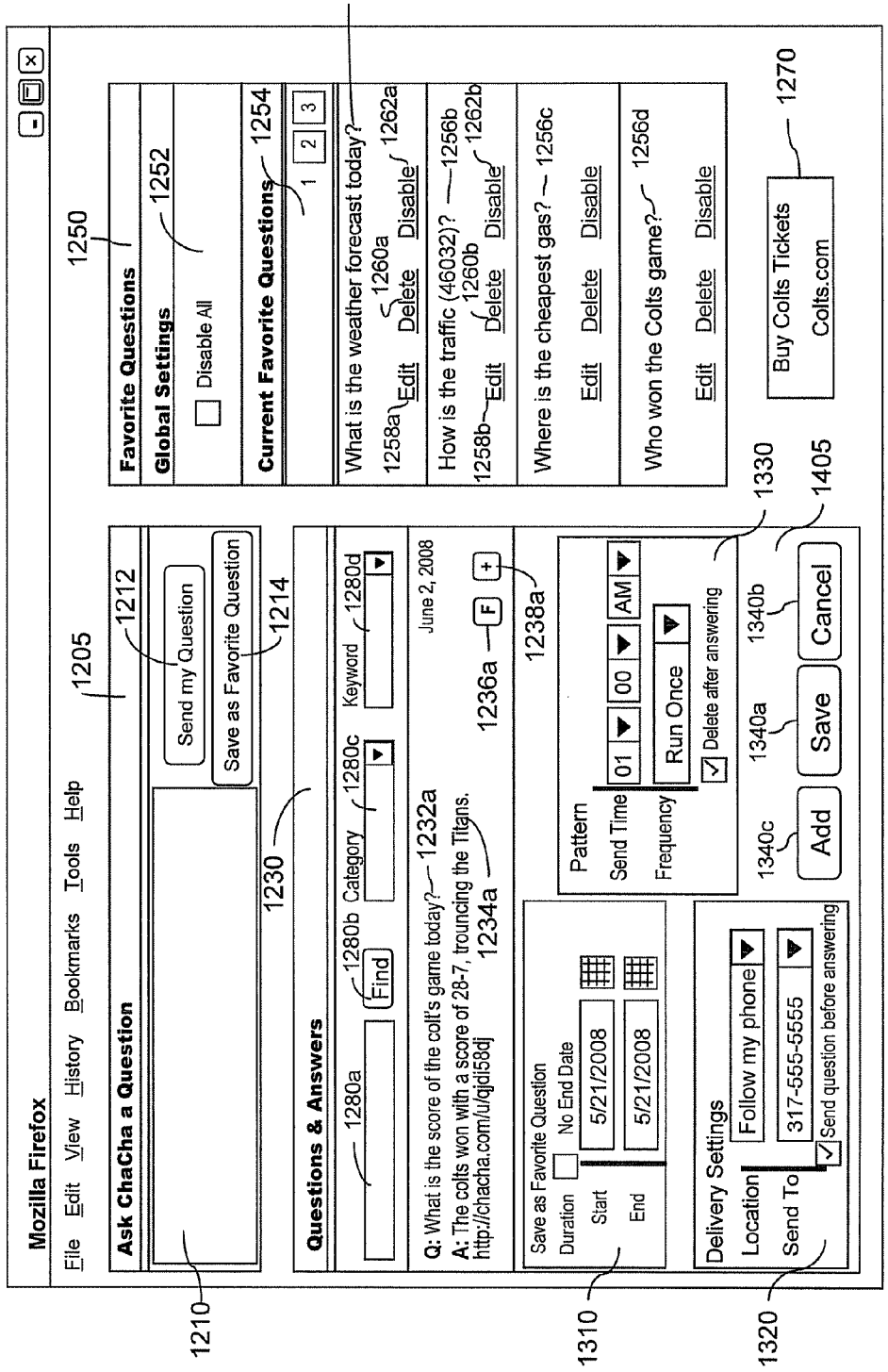
FIG. 14 illustrates a GUI for viewing a trigger associated with a request.

A GUI 1400 for creating a triggered search request based on a historical search request is illustrated in FIG. 14. Activation of the favorite query creation control 1236*a* may cause a favorite query creation window 1405 to be presented. The favorite query creation window 1405 may include the duration controls 1310, the delivery controls 1320, the pattern controls 1330 and the action buttons 1340 as previously described with respect to FIG. 13. In at least one embodiment, additional controls for defining a trigger and/or a request may be provided, such as a trigger condition box which may be interpreted by a guide. As such, a historical search request may be modified to automatically trigger a recurring request (automated request).

Figure 15:
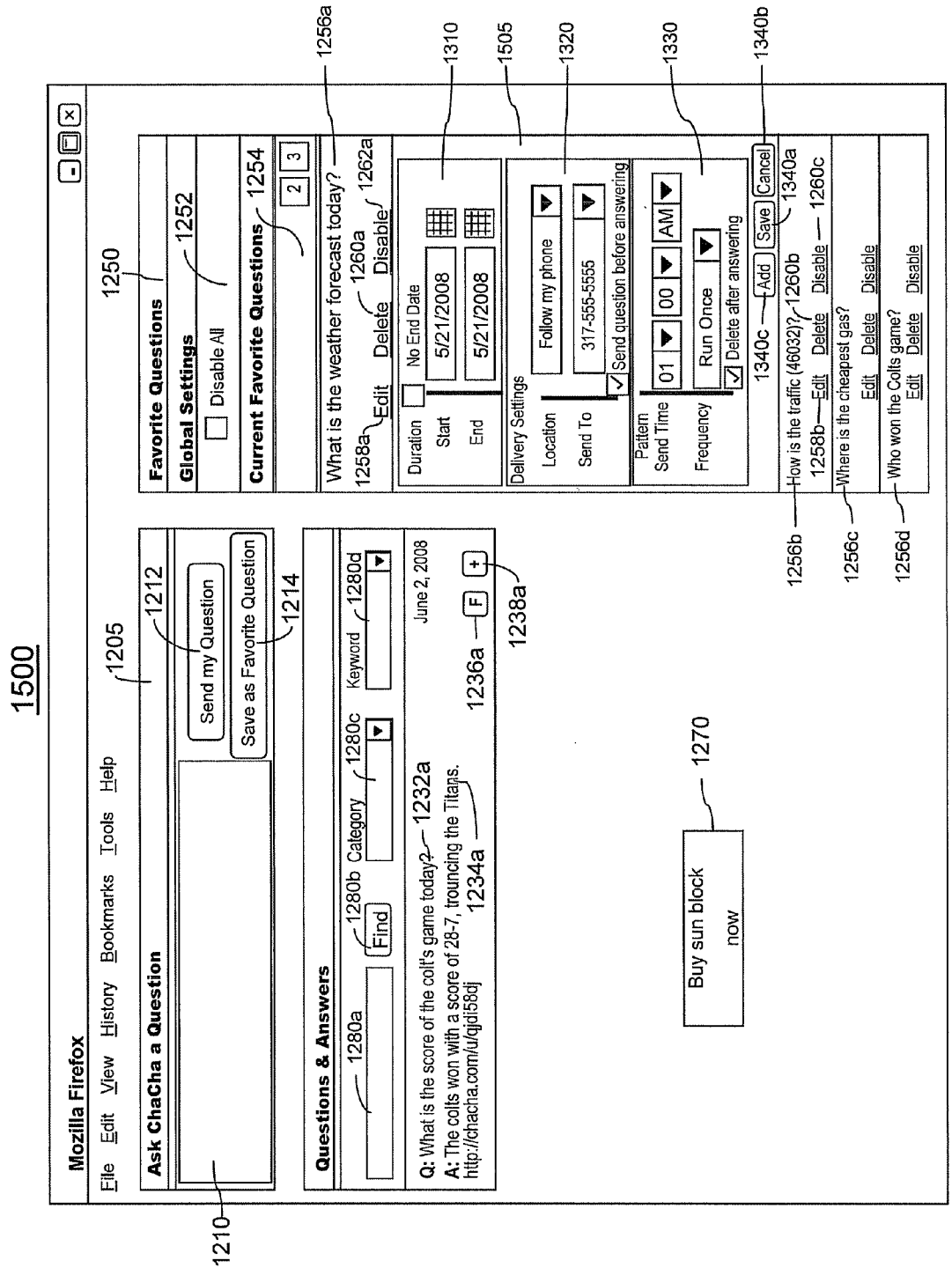
FIG. 15 illustrates a GUI for associating a triggered request with a user.

A GUI 1500 for creating a triggered search request based on a current search request is illustrated in FIG. 15. Activation of the 'edit' control 1258*a* may cause a favorite query editing window 1505 to be presented. The favorite query editing window 1505 may include the duration controls 1310, the delivery controls 1320, the pattern controls 1330 and the action buttons 1340 as previously described, and a query editing box 1510. The query editing box 1510 may be used to indicate and/or modify content of a favorite query.

Figure 16:
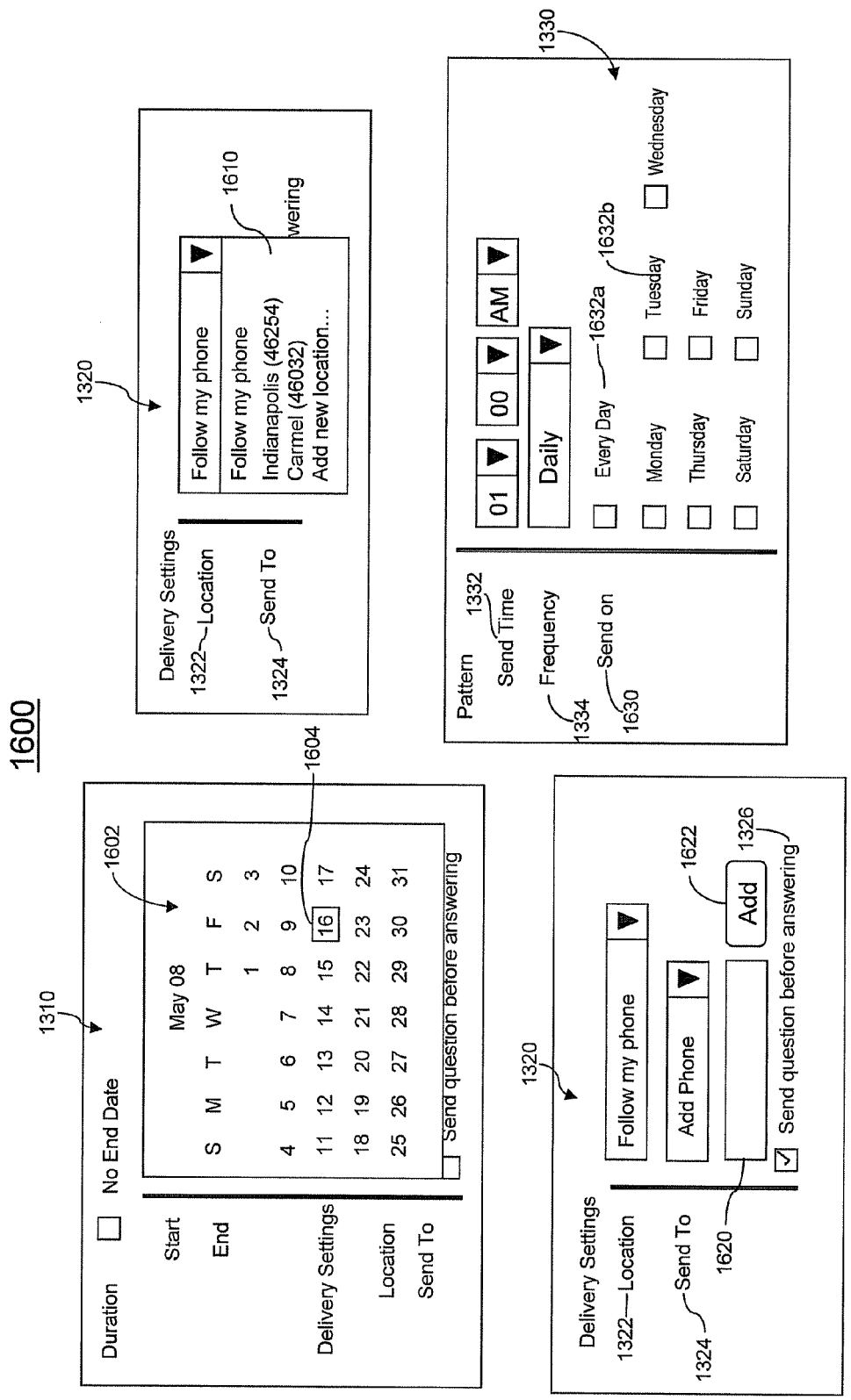
FIG. 16 illustrates a GUI for associating a trigger with a request.

The duration controls 1310 may include a calendar pop-up window 1602 as illustrated in FIG. 16. The calendar pop-up window 1602 may be provided if the calendar indicator 1304*a* (FIG. 13) is selected. The calendar pop-up may include a date indicator 1604 which may be used to indicate a date associated with a favorite search request. Changing the position of the date indicator 1604 may change a start and/or end date associated with a triggered request.

The delivery controls 1320 may include a drop-down menu 1610 (FIG. 16) associated with a location indicator 1322. The 'Follow my phone' option may cause a location associated with a user mobile device to be associated with a triggered search request, which may override location information associated with an original search request. A list of locations associated with a user may be presented in the drop-down menu 1610.

The delivery controls 1320 may include a delivery service entry box 1620 and an 'add' action button 1622 associated with the delivery indicator 1324. The 'add phone' option may cause the delivery service entry box 1620 and the 'add' action button 1622 to be presented. The delivery service entry box 1620 may be used to indicate a phone number, email, IM, web service or other delivery service information which may be used to deliver a search result. The 'add' action button 1622 may be used to record the information indicated in the delivery service entry box 1620.

The pattern controls 1330 may include a delivery selection indicator 1630 (FIG. 16) based on an option selected in the delivery frequency control 1334. For example day of week indicators 1632 may be provided when the 'daily' option is selected in the delivery frequency control 1334. The 'Every Day' selector 1632a may cause a request to be triggered every day when activated. The 'Tuesday' selector 1632b may cause a request to be triggered every Tuesday.

Figure 17:
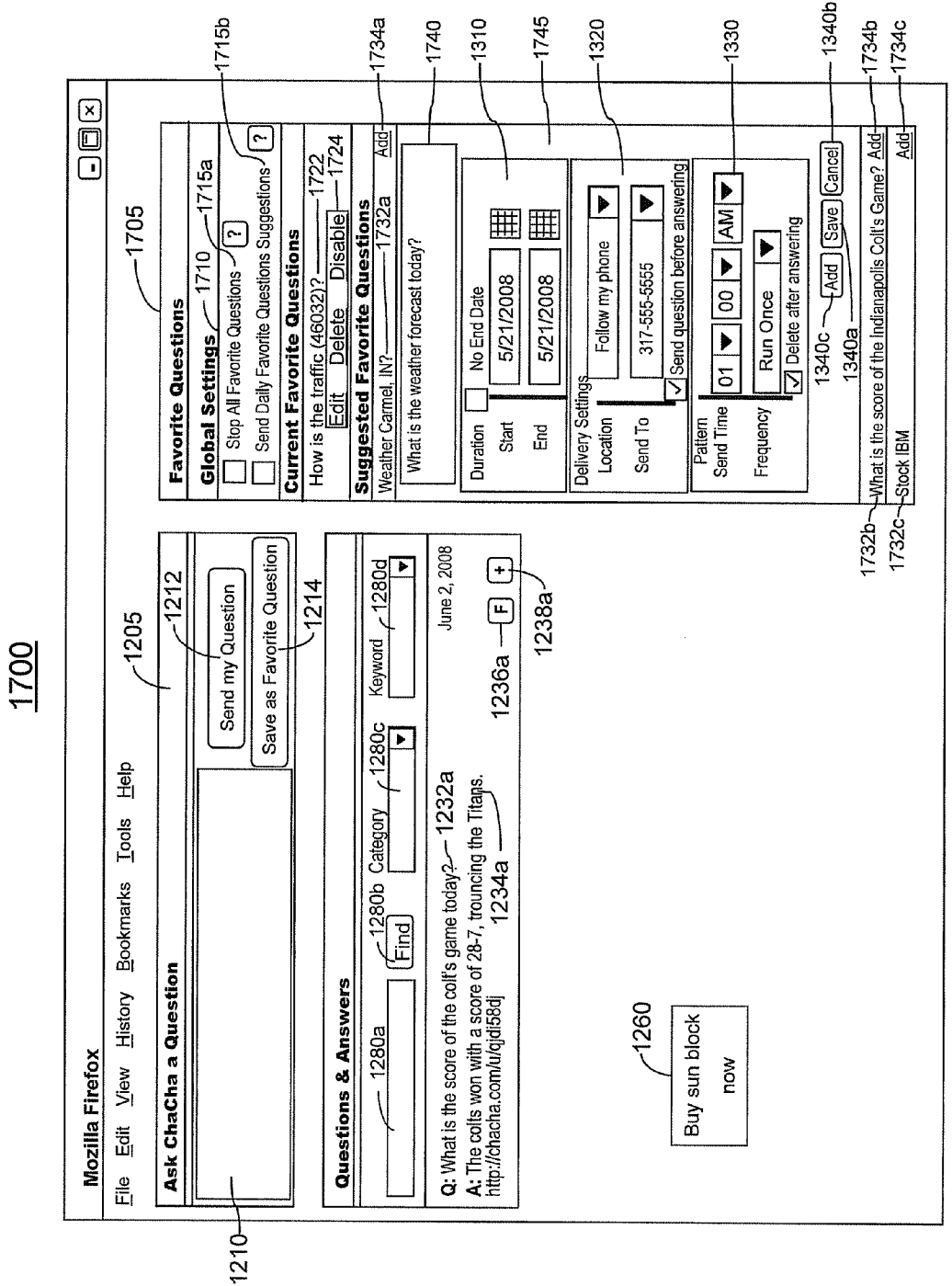
FIG. 17 illustrates a GUI for creating a triggered request.

In at least one embodiment, a GUI such as the GUI 1700 illustrated in FIG. 17 may be provided. The GUI 1700 may include a favorite query management window 1705, a global favorite query settings window 1710, a current favorite query indicator 1722, current favorite query action controls 1724, suggested favorite query indicators 1732, suggested favorite query action controls 1734, a suggested favorite query management window 1745, and a suggested favorite query box 1740.

The favorite query management window 1705 may be used to indicate information regarding favorite queries or questions. The global favorite query settings window 1710 may include controls to change the status of favorite queries which affect all favorite queries. For example, a 'stop all favorite questions' global favorite query control 1715a may be used to activate or de-activate all favorite queries associated with a user by toggling the state of the check box. Likewise a 'send daily favorite question suggestions' global favorite query control 1715b may be used to activate or de-activate the favorite query suggestion function by toggling the state of the check box. A current favorite query indicator 1722 may indicate the content of a current favorite query associated with a user. Current favorite query action controls 1724 may be used to edit a current favorite query as previously explained with respect to FIG. 15.

The suggested favorite query indicators 1732 may be used to indicate a suggested favorite query. A suggested favorite query may be selected based on any information. For example, any information indicated in the search system database 120 (FIG. 1) might be used to select a suggested favorite query. Information such as previous queries, profile information such as demographics, etc. or other information associated with a user and/or a guide may be used to select a suggested favorite query to be presented in the GUI 1700. The suggested favorite query indicator 1732a indicates the suggested query 'Weather Carmel, Ind'. Activation of the 'Add' suggested favorite query action control 1734a may cause the suggested query management window 1745 to be presented. The suggested favorite query box 1740 may indicate information associated with a query identified by the suggested favorite query indicator 1732a. The suggested favorite query editing window 1745 may include the duration controls 1310, the delivery controls 1320, the pattern controls 1330 and the action controls 1340 previously described.

Any number of suggested favorite queries may be presented in the GUI 1700. For example, the suggested favorite query indicator 1732b and the suggested favorite query indicator 1732c may be used to indicate additional suggested favorite queries to a user. An 'Add' suggested favorite query action control 1734b may cause the query 'what is the score of the Colts game?' to be added to the favorite queries associated with a user and an 'Add' suggested favorite query action control 1734c may cause the query 'Stock IBM' to be added to the favorite queries associated with a user. Filtering controls may be provided to select suggested favorite queries as previously described. For example, favorite queries associated with a category, keywords, or other information might be selected using controls such as the existing favorite query filter controls 1254 (FIG. 12).

While the GUIs 1200, 1300, 1400, 1500 and 1700 have been illustrated using particular types of control elements, other equivalent control elements as are well known in the art may be utilized to implement any of the GUIs 1200, 1300, 1400, 1500 and 1700.

In at least one embodiment, the GUIs 1200, 1300, 1400, 1500 and 1700 may be used by a guide. For example, a guide may create a search query based on a spoken query received from a user, and may subsequently associate a condition with the request. A guide may associate one or more users with an existing search request. For example, if a request submitted by a user is matched to an existing search request, a user ID may be added to a record associated with the request. A user may be associated with a search request automatically. For example, a user may elect to be associated with a keyword, a category and/or other item and if the item is associated with a triggered search request a user may be associated with the triggered search request. Information of a triggered search request may be provided to one or more user who may elect to be associated with a triggered search request. User may be provided with information of a search request using any user system. For example, a user may receive information of a triggered search request using a text message and may elect to receive a search result based on a response using a text message, a website, an email, an IM, etc.

Using the embodiments described herein, a user may submit a request to a human-assisted search system, which may be associated with a condition which may cause an information search to be performed responsive to the request. A search result may be provided to a user based on a request associated with a condition using any or all communication services associated with a user. A condition associated with a search request or 'trigger condition' may be any condition which is identified by a user and/or a guide. A guide may perform an information search in order to determine whether a condition associated with a search request is met. A search result may be provided to a user using any communication service such as a messaging service (SMS, MMS, EMS, voice messaging, etc.), email, Instant Messaging (IM), a web service, regular mail, etc. In particular, a text or IM alert regarding a search request and/or a search result may be provided to a user when a search result is obtained responsive to a search request associated with a condition. An alert may be delivered to a user, and a user may create a search request responsive to the alert. A guide and/or other information may be selected responsive to a search request associated with an alert based at least in part on the content of the alert.

A database of resources may be provided which may assist a guide and/or a user to identify and/or monitor a trigger condition. A database of communication information associated with a user, a guide and/or a resource is utilized to allow a communication session to be established between a user, a guide and/or a resource.

A user may be able to define a triggered or recurring search request which is an arbitrary request which is triggered by an arbitrary condition. A user may request any type of information to be provided based on any type of condition. As a human guide may interpret a search request and a trigger condition, limitations of previous solutions which rely on using automation are overcome. However, the use of humans to perform a search and to identify and monitor a trigger condition may be costly. As a result, it is important to ensure that as many users as possible who may have an interest in a triggered search and/or search result may benefit from the result.

In the new system, available triggered requests are published to users in a searchable, indexed manner which may allow users with a common interest to identify and utilize triggered requests which may already exist. If a triggered request is associated with multiple users, the cost to serve per user is lowered. A user may be provided with a set of tools which may be used to create and manage recurring queries. Likewise, a person such as a guide may review information regarding user requests and may offer a user an opportunity to be associated with a triggered request. For example, a guide associated with a school might offer users associated with the school an opportunity to receive a search result associated with a school activity such as academics, athletics, fundraising, etc.

Aggregated information of triggered requests may be used to identify a resource which may be utilized to respond to requests associated with a category, profile, and/or other classification. An automated resource and/or a human assisted resource may be identified and/or solicited in order to respond to a triggered request. Because the new system may provide a human assistant to interpret (and modify as needed) a request and/or a trigger condition, requests which may be similar to existing requests may be recognized and managed using known resources. Similarly, if a request and/or trigger condition is novel, a guide may be utilized to identify a response, which may be used and/or refined if additional users show interest in a request. A user may benefit from a responsive and flexible information service, a guide may benefit from compensation for services rendered, and a search service provider may obtain more users, and may amortizing cost to serve over more users. A guide and/or a user might establish groups of users who might be associated with a triggered search request.

While the system and methods are described in the context of a generalized search service, the technology might be applied to other types of activities. For example, a customer service system, a shopping service, a commerce platform, and/or other systems wherein users obtain and share information might benefit from creation, aggregation and utilization of the methods and systems described herein.

A method and system are disclosed whereby a human searcher may receive information of a search request and may be presented with information resources and a rich toolset which are related to the query. A human searcher or guide may be automatically presented with resources which are associated with a category, location, keywords, or other information associated with a query which may allow the searcher to rapidly locate a search result. Information presented to a guide is selected based on one or more categories associated with a query and may include information which may allow a guide to redirect a query which has been incorrectly categorized. Information provided to a guide may be stored in a database and may be presented in a format which allows a common look and feel between different types of subject matter in order that a guide may be able to handle a query in an unfamiliar area more effectively based on previous experience with the toolset and the resources provided.

A query is received by the search system and may be processed by an agent or ambassador system, which may utilize the assistance of a human searcher in order that the query may be analyzed and may be compared to a database of queries. Comparison to a database of queries may be used to identify a number of existing search results and search queries and may be used to associate a number of categories with a search request. Information associated with a search request may be used to select and/or rank resources which are provided to a number of guides selected who may provide a search result responsive to the request.

A search request, which may include a keyword, a phrase, and/or a fully formed sentence, and/or information such as images, audio, video, or any type of media, is received by a search system selectively utilizing the assistance of human searchers or guides. A search result is provided to a user responsive to a search request. A search result may be produced using any resource and/or other information which may be accessible to a guide or a search system. A search request may be compared to a database of search requests and/or queries in order to determine whether a matching query exists. If a matching query is determined to exist, a search result associated with the matching query may be automatically presented to a user responsive to a search request. If an exact match to a search request is determined not to exist, a search request may be routed to a searcher who may analyze a user request. A searcher or guide may analyze a user request to construct a search query which conforms to a specific sentence structure of syntax. A structured query may be used to index a database of search requests and/or queries, which improves process of the disclosed system including re-use of search results and/or resources. A searcher or guide performing a query analysis role may be referred to as an ambassador guide or ambassador.

A query formation tool is provided to a guide that assists in the formation and disambiguation of a search query and may provide additional information to a guide in order that a categorization, a search result, a search resource, an advertisement, and/or a searcher may be associated with a search request submitted by a user. A guide may provide information which associates a user query with an existing search query, and such information may be stored in a database. Information of equivalence relationships between any or all elements of a search request may be recorded. A search query may be associated with an automated search system and/or other search resource based on content of the search query. Such information may be used to associate search queries which have a common syntax with a search resource, category, or other information which may be used to produce a search result and/or other information which may be returned to a user responsive to a search request.

A system database is provided which may include records which indicate a search result associated with a structured query or a search request constructed according to a particular syntax, and other forms of a search request which have been associated with the structured query. Matching of a user search query may be performed based on equivalence of structure and/or one or more elements contained in a search query. For example, a meaning of a keyword may be determined based on a category and/or profile associated with a search request. As further described in the related US Provisional Application serial number 231/049597 previously mentioned.

The system database may include information of resources associated with a taxonomy which may be provided to a searcher and may be created and maintained using the system and method further described in the related US Provisional Application serial number 231/053885. previously mentioned.

A guide may be provided with a toolset which allows the guide to select a search result and/or a resource which may satisfy a user request. Such a toolset may be configured to allow guides to share information regarding resources which may improve a selection made by a guide. A guide may transfer a user request and/or a communication session to another guide.

The terms voice and speech are used interchangeably herein. A user, a resource, and/or a guide may establish a communication session using a voice service, a messaging service such as Short Messaging Service (SMS), Enhanced Messaging Service (EMS), Multi-media Messaging Service (MMS), Instant Messaging (IM), email, an internet portal or web page, regular mail or any other type of communication. A connection or communication session may be established using any device which is capable of utilizing a communication service. For example, a wireless device such as a cell phone, PDA, smart phone, etc., might be used to establish a communication session using voice, SMS, IM, email and/or internet protocols. A desktop, laptop or server system might be used to establish a communication session. A landline phone, a specialized communication terminal, or any other communication device might be used to establish a communication session.

Figure 18:
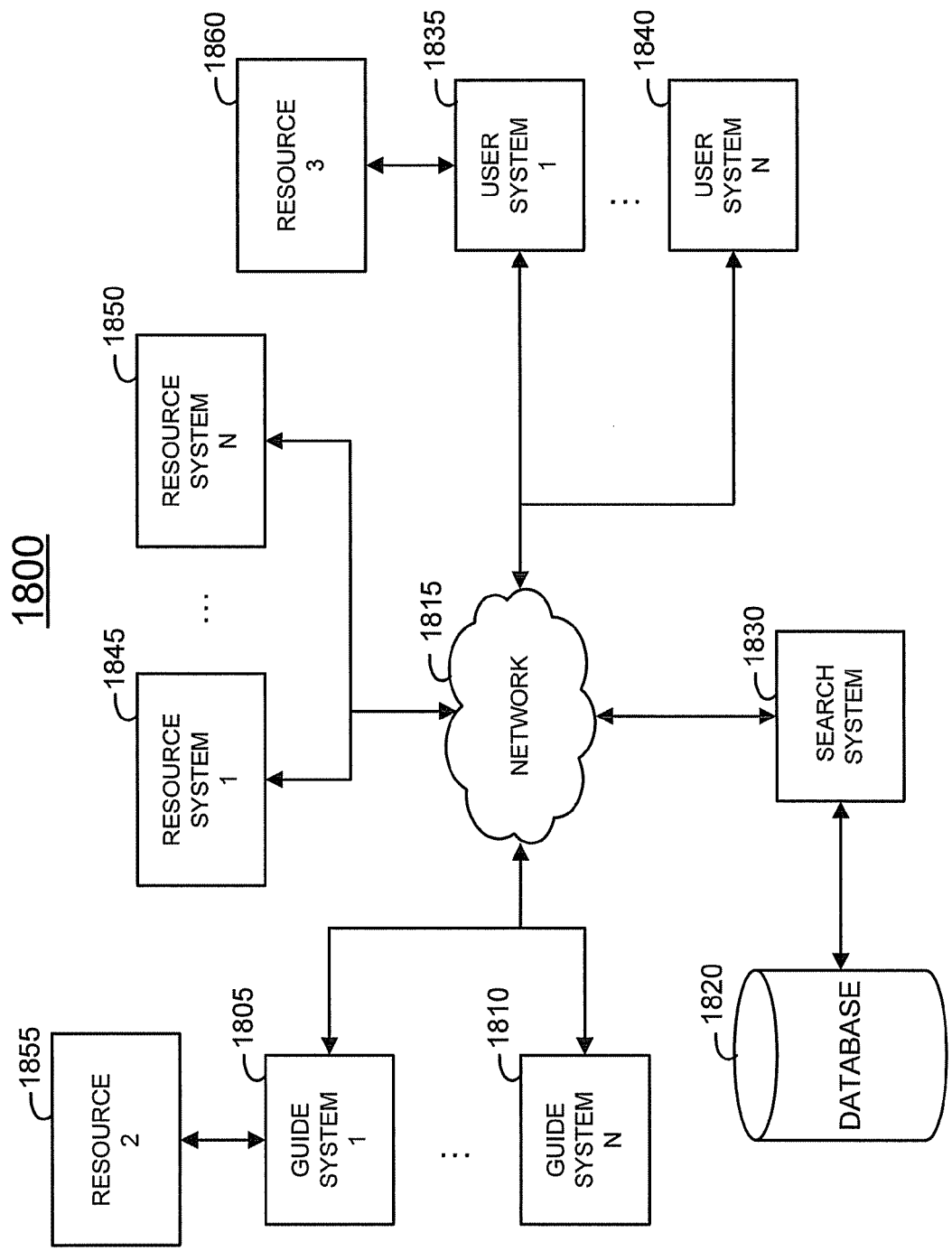
FIG. 18 is a block diagram of an exemplary system embodiment.

Communication between a guide, a user, a resource and/or a search system may include conversion of text to speech and speech to text. Any type of conversion and/or other processing of information which may facilitate communication between a user, a guide, a resource and/or a search system may be performed by an element of the system 1800 (FIG. 18). Any type of media which can be sent and/or received using a communication system may be part of a communication session. A communication session may be conducted using any or all communication service associated with a user, a resource and/or a guide. Any communication session may include communication via multiple service and/or device. For example, a request may be submitted as a voice query, which might indicate an image located on a resource accessible to a user and/or a guide, the voice query might be converted to a text message, the image might be processed in order to associate a tag and/or other images with the image, and a response might be provided as a spoken reply to a mobile phone associated with a user, and a video presentation which is accessible via a high-speed connection, which might be delivered to a browser functionality of a different user device.

An advertisement may be transmitted including during any or all communication sessions between a user, a guide and/or a search system. A resource, a guide, and/or an advertisement may be rated. Rating information may be obtained from a user, a guide, a resource and/or a search system. Rating information may be used to select a resource, a guide, an advertisement and/or any item based on information associated with an item indicated in a database. A search service may be compensated by advertising revenue. Advertising or content may be delivered to a user, and/or guide using any service associated with a user and/or guide As illustrated in FIG. 18, system 1800 includes guide system 1805, 1810, a network 1815 such as the Internet, a search system 1830, user system or information seeker system 1835, 1840, a database 1820, which may comprise various records, a resource 1855, and resource systems 1845, 1850, and a resource 1860.

While only a limited number of systems associated with a guide (also referred to as a human searcher or human assistant), resource (also referred to as a search resource), user (also referred to as an information seeker or requester) and as a search system are depicted in FIG. 18, it is within the scope of the disclosure for multiple systems for guide, resource, information seeker and search systems to be utilized.

Any user system (e.g., the user systems 1835, 1840) can be operated by an information seeker, who may be any person, to submit a search request to the search system 1830 and/or receive a search result and/or other information. Any guide system (e.g., the guide systems 1805, 1810) can be operated by a human searcher to obtain a search result responsive to a request which may have been submitted by an information seeker located at a user system (e.g., the user systems 1835, 1840). Any resource system (e.g., the resource systems 1845, 1850) may be operated by a human provider of information and/or may be an automated system which may provide a search result and/or other information to a guide and/or a user, such as a search engine, a database, a local information source of a guide system such as a disk or removable memory, etc. A resource may not be accessible using the network 1815. For example, a resource such as the resource 1855 may be accessible to a guide operating a guide system such as the guide system 1805, or a resource such as the resource 1860 'Resource 20' may be accessible to a user operating the user system 1835. A resource might include printed materials, images, video, and/or audio information, a software application, any information accessible to a guide, a user, a database, a system and/or any combination thereof.

The network 1815 (FIG. 18) may be a global public network of networks (the Internet) and/or consist in whole or in part of one or more private networks and communicatively couples the guide systems 1805, 1810, the resource systems 1845, 1850 and the user systems 1835, 1840 with the other components of the system such as the search system 1830, and the database 1820. The network 1815 may include one or more wireless networks which may enable wireless communication between the various elements of the system 1800. For example, a mobile phone carrier network might be used to connect a user device to the search system 1830.

The search system 1830 allows interaction to occur among the guide systems 1805, 1810, the resource systems 1845, 1850 and the user systems 1835, 1840. For example, an information search query can be transmitted from the user systems 1835, 1840 to the search system 1830, where a search query can be accessed by the guide systems 1805, 1810 and/or the resource systems 1845, 1850. Similarly, a search result or response produced from the resource systems 1845, 1850 using the guide systems 1805, 1810 in response to a search query submitted by the user systems 1835, 1840 may be transmitted to the search system 1830, where it may be stored by the search system 1830 and/or may be transmitted to the user systems 1835, 1840. Any type of communication between a user, a guide, and a resource may be mediated and/or facilitated by the search system 1830, and/or other elements of the system 1800.

The search system 1830 is communicatively coupled with the database 1820. As will be described herein in further detail below, the database 1820 includes data that is processed in association with operation of the embodiments. Although FIG. 18 illustrates the database 1820 as a separate component of the system, the database 1820 may be integrated with the search system 1830. Further, the records maintained in the database 1820 may be stored in any typical manner, including in a Network Attached Storage (NAS), a Storage Area Network (SAN), etc., using any typical or proprietary database software such as DB2®, Informix®, Microsoft® SQLServer™, MySQL®, Oracle®, etc., and may also be a distributed database on more than one server. Elements of the database 1820 may reside in any suitable elements of the system 1800. Any or all elements of the system 1800 may include any or all of the database 1820.

The user systems 1835, 1840, the guide systems 1805, 1810, the search system 1830 and the resource systems 1845, 1850 may include equipment, software, systems and personnel required to send and/or receive messages between a user system, a guide system, a resource system and/or the search system using the network 1815. The database 1820 includes information which may allow the search system 1830 to establish communication between any or all of the elements of the system 1800.

A user system, a guide system, and/or a resource may be a desktop or mobile PC or Mac®, a mobile phone, a smart phone, a PDA, a server system, a landline phone, a specialized communication terminal, a terminal connected to a mainframe, or any other communication device and/or system. The search system 1830 may include one or more servers, computers, etc. For example, servers such as the PowerEdge® 2900 by Dell, or the BladeCenterJS22 by IBM, or equivalent systems might be used to implement elements of the search system 1830. The search system 1830 may utilize an operating system (OS) such as Microsoft Windows XP, or Linux, etc. Voice routing and packet switching may be accomplished using well established technologies such as those provided by Cisco, or other networking companies. After being presented with the disclosure herein, one of ordinary skill in the relevant art will immediately realize that any viable computer systems and/or communication devices known in the art may be used as user systems, guide systems, resources, and/or to implement the search system 1830.

A guide may be required to register with the search system 1830. As part of a registration process, at least one communication method is associated with a guide. In at least one embodiment, a guide may register with the search system 1830 and establish a username and password which are associated with the guide. A guide may login to the search system 1830 using a web browser functionality of the guide system 1805 in order to communicate with the search system 1830. Multiple communication services may be associated with a guide and may allow a communication session to be established between a guide system such as the guide system 1805 and a user system, a resource system and/or the search system 1830. Multiple identifiers of a guide may be associated with each other. Information such as IM credential, an email address, a phone number, a URL, a username, etc., of a guide may be identified which may allow the search system 1830 to establish a communication session between a guide system and a user system, a resource system, and/or the search system 1830.

When a guide registers with the search system 1830 the guide may be associated with one or more keywords, categories, and/or other information. For example a keyword or category may be selected by a guide, or may be associated with a guide based on a test administered to a guide and/or other information provided during and/or after a registration process. Information associated with a guide may be stored in the database 1820 and may be used for purposes such as matching a guide to a user request, determining and/or providing compensation for a guide, communicating with a guide, etc., as will be described further herein.

A user may be identified by the search system 1830. When a user system such as the user system 1835 establishes a communication session with the search system 1830, an identifier of a user system is determined. An identifier of a user system may be associated with other information regarding a user. A user system may be identified using an email address, a telephone number, an IM credential, a username, or any other identifier which may be used to associate information with a user. Multiple identifiers of a user may be associated with each other. Using information of communication services associated with a user, a communication session may be established between a user system such as the user system 1835 and a guide system, a resource system and/or the search system 1830. Information such as a keyword, a category, a user profile, a previous search request, a search result, etc., may be associated with a user. Information of a user may be stored in the database 1820.

A resource, which may be a person, an entity, a search engine, a database, a software application, a corpus of one or more types of media such as text or printed information, images, audio, video, etc., or a combination thereof may be identified by the search system 1830. Any source of information may be a resource within the context of the disclosure herein. Information of at least one method of communication is associated with a resource system which allows a communication session to be established between the search system 1830, a user system and/or a guide system and a resource system such as the resource systems 1845, 1850. An identifier of a resource system may be associated with other information regarding a resource. A resource system may be identified using an email address, a telephone number, an IM credential, a resource username, a URL or other persistent identifier which may be used to associate information with a resource. Multiple identifiers of a resource may be associated with each other. Using the information of communication services associated with a resource, a communication session may be established between a resource system such as the resource system 1845 and a user system, a guide system, and/or the search system 1830. Information such as a keyword, a category, a profile, or other information may be associated with a resource. Information of a resource may be stored in the database 1820.

A resource such as the resources 1855, 1860 and/or resources accessible via the resource systems 1845, 1850 may include any system, software, hardware, personnel and/or other facility which may provide information to a guide, a user, a resource and/or the search system 1830. For example, a resource may be a search engine, a database system, a library, a personal hard drive and/or other local storage, printed materials, recordings of any sort, a software program, a person or person, an organization, etc. A resource may be freely accessible to any user and/or guide and/or may be available on a restricted basis. The resource systems 1845, 1850 may include resources which are available on an unrestricted and/or restricted basis. A resource may not be accessible using the network 1815, but may be accessible to selected guide. For example, a resource such as the resource 1855 may be accessible to one or more guides operating a guide system such as the guide system 1805 using any type of communication. For example, a guide may obtain information of an event by observation and/or other means to provide a search result. Information in any form, such as printed media, audio and/or visual information, software, hardware, etc., which may be accessible to a guide, a user and/or an operator of a resource system may be a resource.

The search system 1830 may establish a communication session between any user system, guide system and/or resource system using information indicated in the database 1820. For example, the user system 1835 may establish a voice communication session with the search system 1830, the search system 1830 may establish a voice communication session between the user system 1835 and the guide system 1805, and the search system 1830 may establish a voice communication session between the user system 1835 and the resource system 1845. While a voice communication session is used in this example, any type of communication session using one or more services such as SMS, EMS, MMS, email, IM, chat, web based communication, etc., may be established between any user system, guide system, and/or resource system and/or the search system 1830.

Information associated with a user, a guide and/or a resource may be obtained in various ways. For example, a registration process may be performed using a web form provided by the search system 1830, and/or information may be obtained from an external database, and/or information may be obtained based on analysis of information indicated by a user, a guide, and/or a resource. A profile may include one or more characteristics which may be associated with one or more individuals. A profile may include geographic data such as a street address, latitude and longitude, etc., may include demographic information such as age, gender, race, income, family size, political affiliations, etc., may include personality information such as results of psychometric testing, subjective evaluations of an individual, etc., may include affiliation information such as employment, club, activity, societal membership information, information of a device, service, transaction and/or any information which might be associated with a user and/or a guide.

Figure 19:
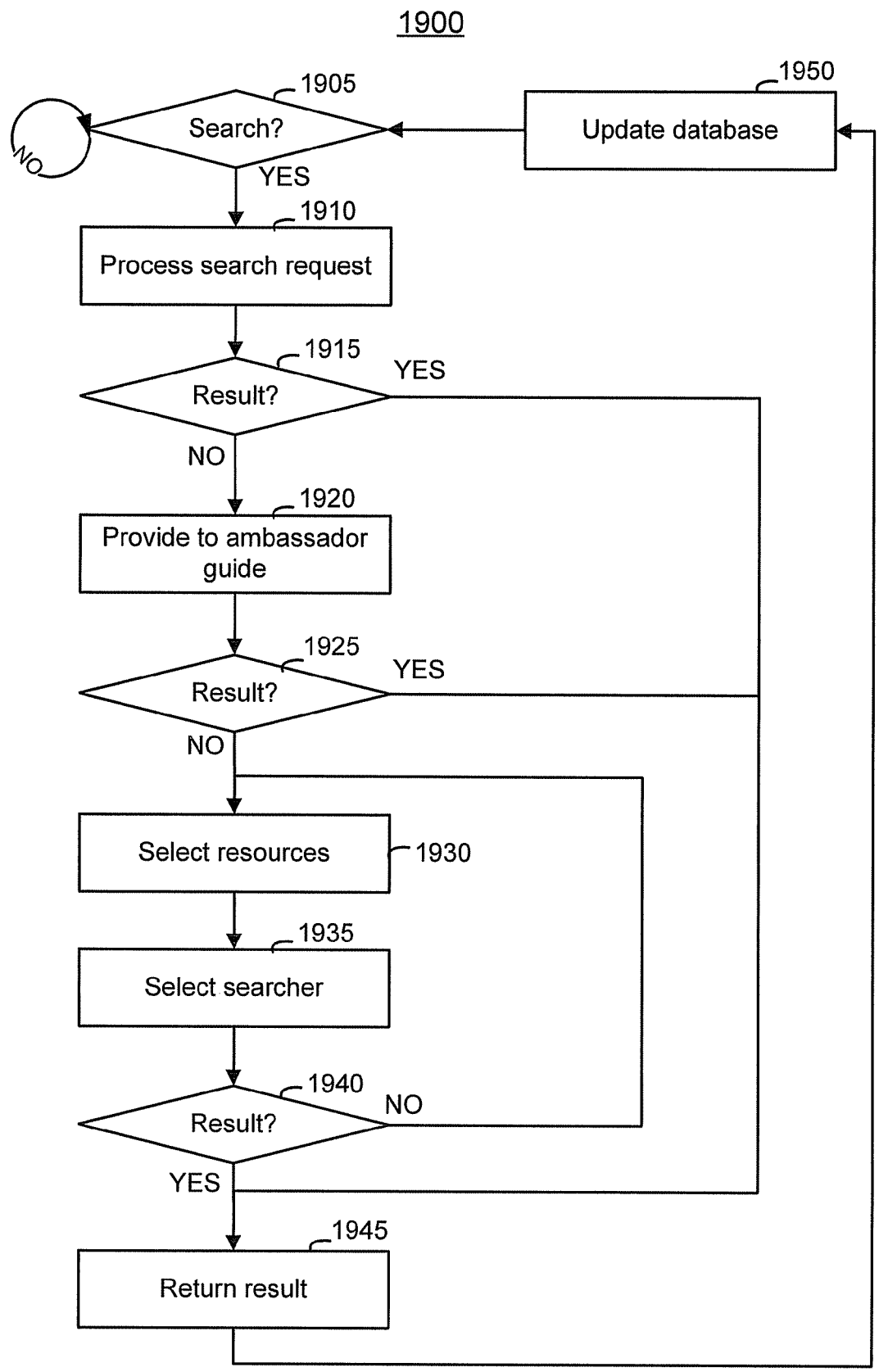
FIG. 19 illustrates a flow chart of a process for performing an information search.

As illustrated in FIG. 19, a process 1900 for processing a request is provided. The process 1900 may be operative on any suitable elements of the system 1800 (FIG. 18).

In operation 1905 a determination is made as to whether a request is received. If it is determined in operation 1905 that a request is not received control remains at operation 1905 and process 1900 continues to wait. If it is determined in operation 1905 that a request is received, control is passed to operation 1910 and process 1900 continues.

The determination in operation 1905 may be made based on various criteria. It may be determined that a request is received based on receiving a message at any device associated with the search system 1830 (FIG. 18). For example, a voice message might be received at telephone number, an SMS message might be received, an IM might be received, an email might be received, a web request might be received, and/or a message using any services associated with the search system might be used to determine that a request has been received. A request may be received through an API.

In operation 1910 a search request is processed. In at least one embodiment, a search request may be parsed in order to determine keywords associated with a request. If a search request is a speech request, it may be transcribed by a human transcriber and/or an automated system. If a search request includes visual or other forms of media, processing of the media may be preformed which may associate metadata with the search request. Any type of processing may be performed which may improve the ability to match a search request with a search result in operation 1910, including but not limited to recognition, analysis, conversion, etc. Control is passed to operation 1915 and process 1900 continues.

In operation 1915 a determination is made as to whether a search result is obtained. If in operation 1915 it is determined that a search result is obtained, control is passed to operation 1945 and process 1900 continues. If in operation 1915 it is that a search result is not obtained, control is passed to operation 1920 and process 1900 continues.

The determination in operation 1915 may be made based on various criteria. In at least one embodiment, if a query is determined to match a query indicated in the database 1820, a search result may be determined to have been obtained. In at least one embodiment, a confidence factor or probability of a match between a request and a request indicated in the database 1820 (FIG. 18) may be used to determine whether a search result is obtained.

In operation 1920 a request is provided to a number of guides in the ambassador role. An ambassador may be selected based on information associated with a search request. For example, an ambassador may have general knowledge relating to a number of categories and/or subject matter associated with a search request, or a first available qualified ambassador guide may be selected, or characteristics associated with a guide and/or a user associated with a request may be used to select an ambassador guide to respond to a search request. In at least one embodiment, multiple guides may be notified of a search request, and order of response may be used to determine the guide selected. An ambassador guide or 'expediter' may further process a search request. For example, a structured version of an original search request may be created, a location may be associated with a search request, a number of categories may be associated with a request, and a match to a query indicated in the database 1820 (FIG. 18) may be determined. An exemplary graphical user interface for processing a query is illustrated in FIG. 190. Control is passed to operation 1925 and process 1900 continues.

In operation 1925 a determination is made as to whether a search result is obtained. If in operation 1925 it is determined that a search result is obtained, control is passed to operation 1945 and process 1900 continues. If in operation 1925 it is that a search result is not obtained, control is passed to operation 1930 and process 1900 continues.

The determination in operation 1925 may be made based on various criteria. In at least one embodiment, if a structured query determined by a guide is determined to match a query indicated in the database 1820 (FIG. 18) it may be determined that a search result is obtained. In at least one embodiment, a confidence factor or probability of a match between a request which may have been modified by a guide and a request indicated in the database 1820 may be used to at least in part to determine whether a search result is obtained. In at least one embodiment, judgment of a guide may be used at least in part to determine whether a search result is obtained.

In operation 1930 search resources are selected. A search resource may be selected based on information associated with a search request. For example, a category, a structured query, a keyword, a location, a user, a user history, a user profile, an image, audio, search result, etc. associated with a search request may be used to select a resource and may be used to determine the presentation of resources to a searcher. In at least one embodiment, a category associated with a search request may be used to select search resources and a presentation format for the search resources. In at least one embodiment a custom search engine (CSE) may rank documents in a corpus of documents associated with a category which may be heterogeneous. Information and/or control of a CSE may be provided to a guide. Control is passed to operation 1935 and process 1900 continues.

In operation 1935 a guide who may be assigned to the 'researcher' role is selected to respond to a search request. A GUI and/or other information which is customized according to a category and/or other information associated with a search request may be presented to a guide. Exemplary GUI's for presentation of information are illustrated herein below. Control is passed to operation 1940 and process 1900 continues.

In operation 1940 a determination is made as to whether a search result is obtained. If in operation 1940 it is determined that a search result is obtained, control is passed to operation 1945 and process 1900 continues. If in operation 1940 it is that a search result is not obtained, control is passed to operation 1930 and process 1900 continues.

The determination in operation 1940 may be made based on various criteria. In at least one embodiment, judgment of a guide may be used at least in part to determine whether a search result is obtained. For example, a guide may activate a control in a user interface to indicate that a search result has been obtained. In at least one embodiment, if a searcher elects to transfer a search to a different guide, it may be determined that a search result is not obtained.

In operation 1945 a search result is provided. A search result may be transmitted from a guide system to the search system 1830 and may be provided to a user. A search result may be provided to a user using any communication service and/or user system associated with the user. In at least one embodiment, a guide may format a search result prior to the search result being transmitted to a user. In at least one embodiment, a search result may include an advertisement. Rating information of a search result may be obtained by the search system 1830. Control is passed to operation 1950 and process 1900 continues.

In operation 1950 information of the process 1900 is recorded. In at least one embodiment, the database 1820 is updated. Information regarding usage of resources, usage of a CSE, a search result, a structured query, a guide, an ambassador, a user, a category, an advertisement and/or other items may be recorded. Control is passed to operation 1905 and process 1900 continues.

Figure 20:
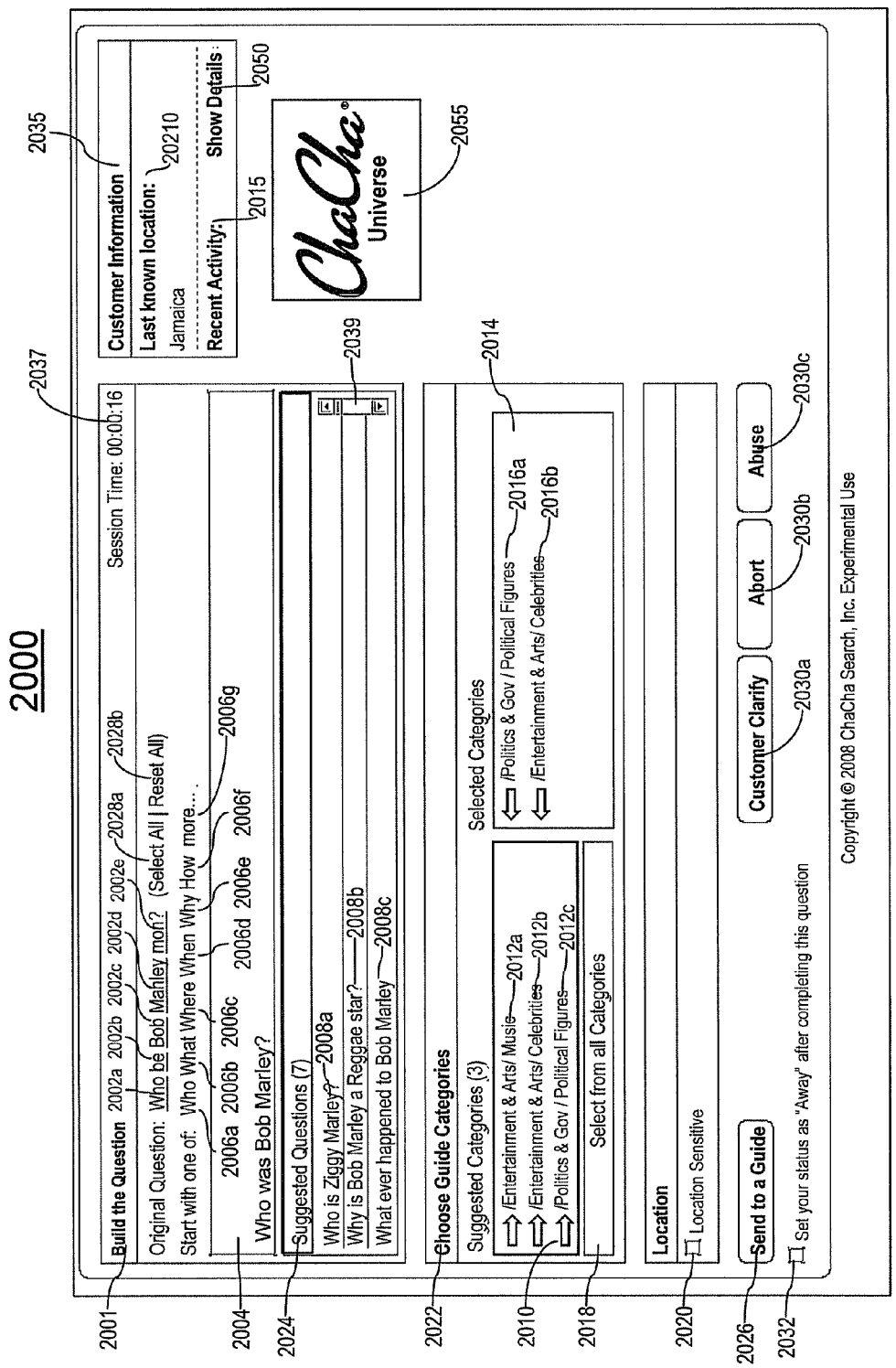
FIG. 20 illustrates a GUI for vetting a query.

As illustrated in FIG. 20, an exemplary GUI for processing a search request is provided. The GUI 2000 may for example be used by a guide in the ambassador role operating a guide system such as the guide system 1805 (FIG. 18). The GUI 2000 may include a query building window 2001, a category selection window 2022, a location indicator 2020 and a customer information window 2035.

Query indicators 2002 may be used to transfer any or all elements of a request submitted by a user to a query box 2004. For example the 'Who' query indicator 2002a, the 'be' query indicator 2002b, the 'Bob' query indicator 2002c, the 'Mahley' query indicator 2002d and the 'mon' query indicator 2002e may be used to transfer a respective word to the query box 2004. Query control global selectors 2028 may be used to manipulate all of a raw query. The 'Select All' global selector 2028a may transfer all content of a raw query to the query box 2004. The 'Reset All' global selector 2028b may remove all content of a raw query from the query box 2004. Predicate selectors 2006 may be used to select an interrogative such as 'Why' or 'How'. For example, activation of the predicate selector 2006a may transfer the word 'Who' to the query box 2004.

The query box 2004 may indicate a structured query determined by an ambassador guide. The suggested query window 2024 may indicate suggested structured queries which may be indicated in the database 1820 (FIG. 18) which may match or partially match a raw query and/or a structured query. Suggested structured query indicators 2008 may be used to indicate a suggested structured query which might allow an ambassador to match a raw query to an existing query. For example the structured query indicator 2008a may be used to select the structured query 'Who is Ziggy Marley?', the structured query indicator 2008b may be used to select the structured query 'Why is Bob Marley a Reggae star?', and the structured query indicator 2008c may be used to select the structured query 'What ever happened to Bob Marley?'

The category selection window 2022 may be used to select a category to be associated with a search request. A suggested category box 2010 may be used to indicate a number of categories which may be associated with a search request based on rating and/or ranking of a category related to a search request. Suggested category indicators 2012 may be used to transfer a category from the suggested category box 2010 to a selected category box 2014. For example, activation of the suggested category indicator 2012a may cause the category 'Entertainment & Arts/Music' to be transferred to the selected category box 2014. The selected category box 2014 may indicate categories associated with a search request. Selected category indicators 2016 may indicate information of a category associated with a search request. The selected category indicators 2016 may be used to transfer a category from the selected category box 2014 to the suggested category box 2010 when activated. For example, activation of the selected category indicator 2016b may cause the category 'Entertainment & Arts/Celebrities to be removed from the selected category box 2014. A 'select from all categories' control 2018 may be used to select from a taxonomy which includes all categories when activated.

A location selector 2020 may be used to indicate whether a search request is sensitive to a location which may be associated with a search request as indicated by a location indicator 2040. The location selector 2020 may toggle between active and inactive when activated by for example changing the state of a 'check box'. A 'send to a guide' action control 2026 may be used to indicate that a task is complete. Activation of the 'send to a guide' action control 2026 may cause information obtained using the GUI 2000 and/or other information associated with a search request to be recorded and/or provided to a guide. A status change control 2032 may be provided to allow a guide to change to unavailable status after completion of an activity. A session timer 2037 may be provided to indicate elapsed time associated with an activity. A scrolling control 2039 may be provided to navigate within content of the suggested query window 2024.

Ambassador action controls 2030 may be used to take actions regarding information in the GUI 2000. The 'customer clarify' action control 2030a may be used to request that a customer provide additional information regarding a search request. The 'abort' action control 2030b may be used to terminate activities associated with a search and transfer the request to another guide. The 'abuse' action control 2030c may be used to report activity by a user to system administrators and may terminate a session. A customer information window 2035 may be used to indicate information of a user associated with a search request. A 'last known location' indicator 2040 may indicate a location associated with a user which may be associated with a search request. A 'recent activity' indicator 2045 may be used to review activity of a user associated with a search request. For example, activation of the recent activity indicator 2045 may cause information of previous queries associated with a user to be provided in the customer information window 2035. A 'show details' control 2050 may activate a window which indicates details of historical activity of a user who submitted a query. An advertising window 2055 may include advertising which may be targeted based on information associated with a query. The advertising window 2055 may allow a guide to select an advertisement which may be provided to a user.

Figure 24:
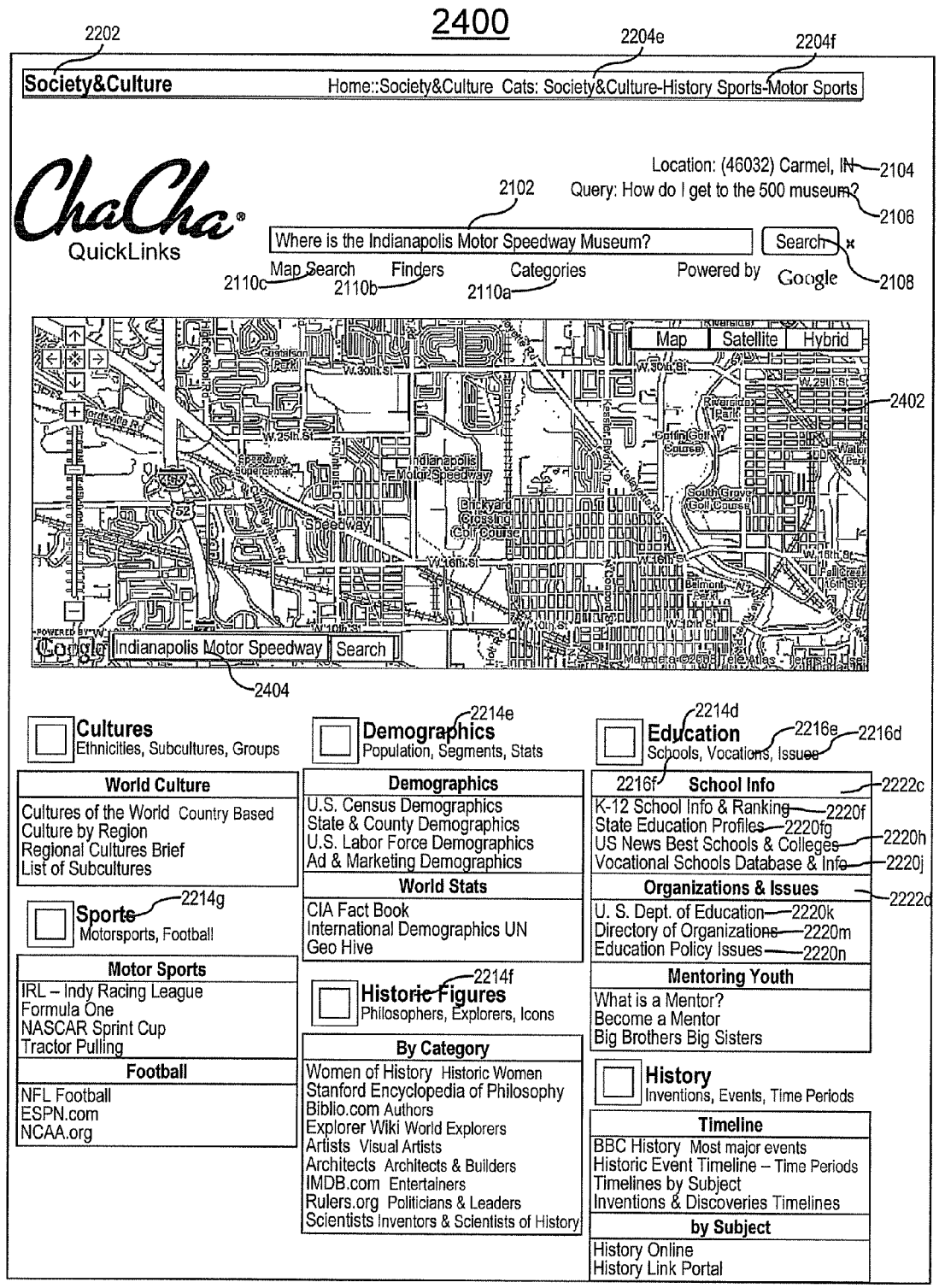
FIG. 24 illustrates a GUI for accessing location based resources.

A GUI 2100 which may be used to obtain a search result is illustrated in FIG. 21. The GUI 2100 may be provided if a query has not been associated with a category. A query box 2102 includes information of a query. A location indicator 2104 may indicate a location associated with a query. A raw query indicator 2106 may indicate content of a request submitted by a user. A 'search' action control 2108 may be used to submit a request indicated in the query box 2102 for a search. As illustrated, a query indicated in the query box 2102 may be reformatted and/or revised. For example, an automated process and/or a guide may determine a query indicated in the query box 2102. Information selectors 2110 may be used for be used for various purposes. The 'map search' selector 2110c may be used to cause a map search to be performed as further described with respect to FIG. 24. The 'finders' information selector 2110b may be used to open a GUI associated with a topic such as those indicated in the 'hot topics' indicators 2112 which may for example be used to obtain information from an automated resource using a web form and/or template. The 'categories' information selector 2110a may be used to open a GUI associated with category selection, which may allow a query to be categorized.

Topic indicators 2112 may be used to indicate a frequently used resource based on a global ranking of activities by a number of guides. For example, the 'election candidates+news' topic indicator 2112a may be use to view a resources associated with 'election candidates+news', such as RSS feeds, political websites, etc. which may relate to current political events. Likewise, the 'joke finder' topic indicator 2112b may be use to view resources which may provide a selection of various types of jokes. If a resource associated with a particular topic is used often, a topic indicator associated with the topic may be added to the GUI 2100, and/or may replace a less used topic indicator. Information and/or resources associated with the topic indicators 2112 may be selected by system administrators. Category indicators 2114 may be used to indicate a category of information. Activation of the category indicator 2114 may cause a GUI associated with a category to be presented. The 'travel' category indicator 2114a may indicate information associated with travel. The 'sports' category indicator 2114b may indicate information associated with sports. The 'PoliticsGov' category indicator 2114c may indicate information associated with politics and government. The resource indicators 2116 may indicate resources associated with a sub-topic associated with a category. For example the 'hotels' resource indicator 2116a may provide resources associated with the category 'travel/hotels' when activated, the 'directions' resource indicator 2116b may provide resources associated with the category 'travel/directions' when activated, the 'trips' resource indicator 2116c may provide resources associated with the category 'travel/trips' when activated, and the 'flights' resource indicator 2116d may provide resources associated with the category 'travel/flights' when activated. The GUI 2100 may be used by a generalist searcher if a query is sent to a searcher which is not categorized. A tool designed for general searching may not be suited to a rapid, effective search by a guide who is associated with a specialized topic, category or area of interest. As a result, it may be more effective if access to resources may be provided based on a categorization and/or other information associated with a search request which may allow a specialized guide or 'researcher' to more rapidly locate a search result. For example, if a category and a structured query have been associated with a request by an ambassador or expediter guide, the request may be directed to a searcher associated with the category.

Figure 22:
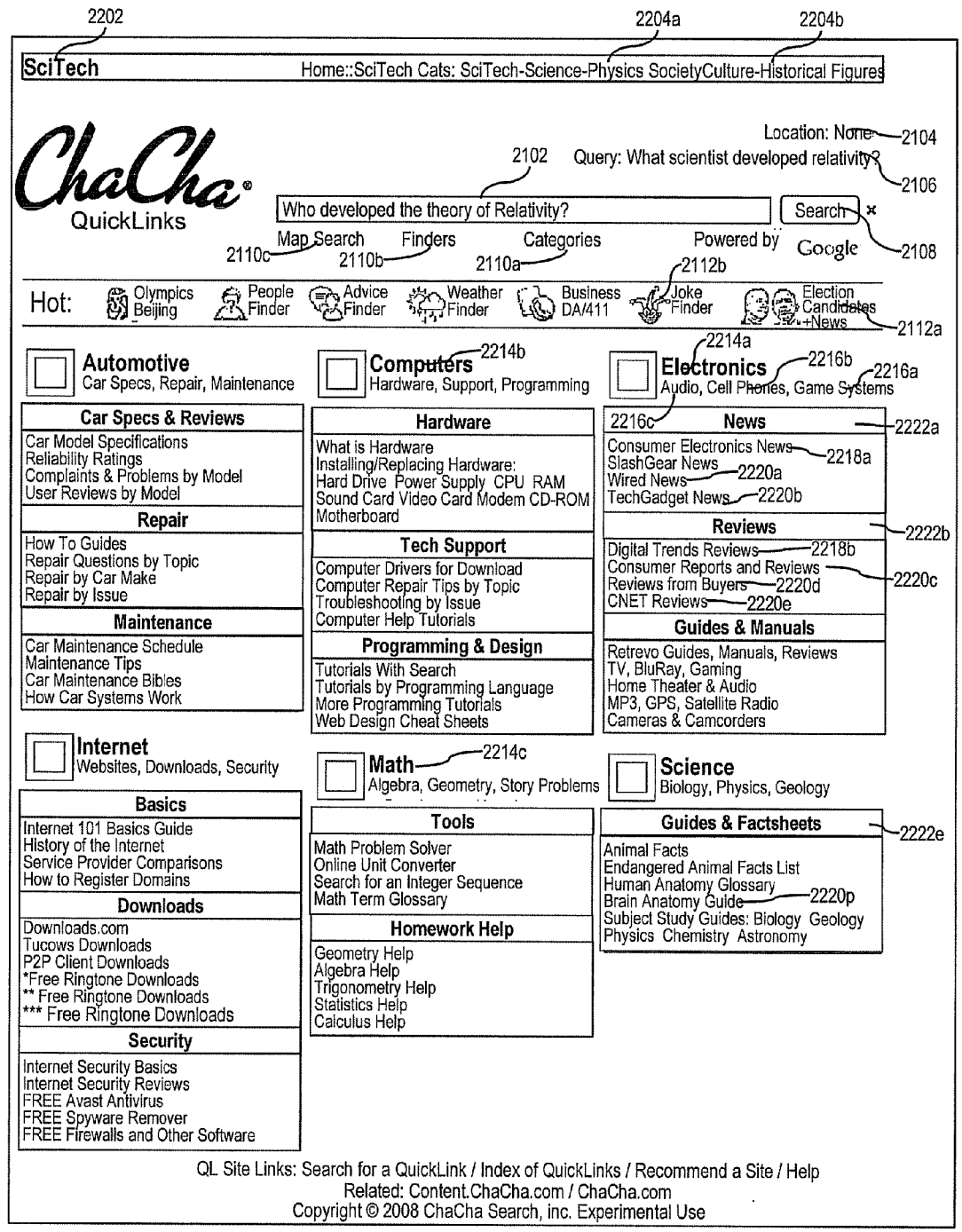
FIG. 22 illustrates a GUI for accessing categorized resources.

A GUI 2200 which may be presented responsive to a query associated with a category is illustrated in FIG. 22. The category 'SciTech' is used for the purposes of illustration in FIG. 22. The GUI 2200 may be presented for example to a guide responsive to selection of the 'Send to a guide' action control 2026 (FIG. 20). The category indicator 2202 may indicate a category associated with a search request. In at least one embodiment, a drop-down list may be provided to a guide in the category indicator 2202 which may allow a guide to select an alternate category which may be associated with a search request, and/or may transfer a request to a different guide. Subcategory indicator 2204 may indicate a number of subcategories which may be associated with a search request. Activation of the subcategory indicator 2204a may cause a GUI associated with 'SciTech-Science-Physics' to be provided. Activation of the subcategory indicator 2204b may cause a GUI associated with 'SocietyCulture-Historical Figures' to be provided. The query 'who developed the theory of relativity' is indicated in the query box 2102. In at least one embodiment, a category selector of categories may be included in the query box 2102.

Subcategory indicators 2214 may be used to identify a group of resources associated with a topic. In at least one embodiment, the order of presentation of the subcategory indicators 2214 may be modified based on a category, keyword, profile and/or other information associated with a search request. The subcategory indicators 2214 may be used to track actions and usage information of features included in the GUI 2200. The 'Electronics' subcategory indicator 2214a may identify search resources associated with 'electronics'. The 'Computers' subcategory indicator 2214b may identify search resources associated with 'computers'. The 'Math' subcategory indicator 2214c may identify search resources associated with 'math'.

Topic indicators 2216 may indicate resources associated with a subtopic associated with a subcategory. The 'game systems' topic indicator 2216a may provide resources associated with 'game systems' when activated. The 'cell phones' topic indicator 2216b may provide resources associated with 'cell phones' when activated. The 'audio' topic indicator 2216c may provide resources associated with 'audio' when activated.

Figure 25:
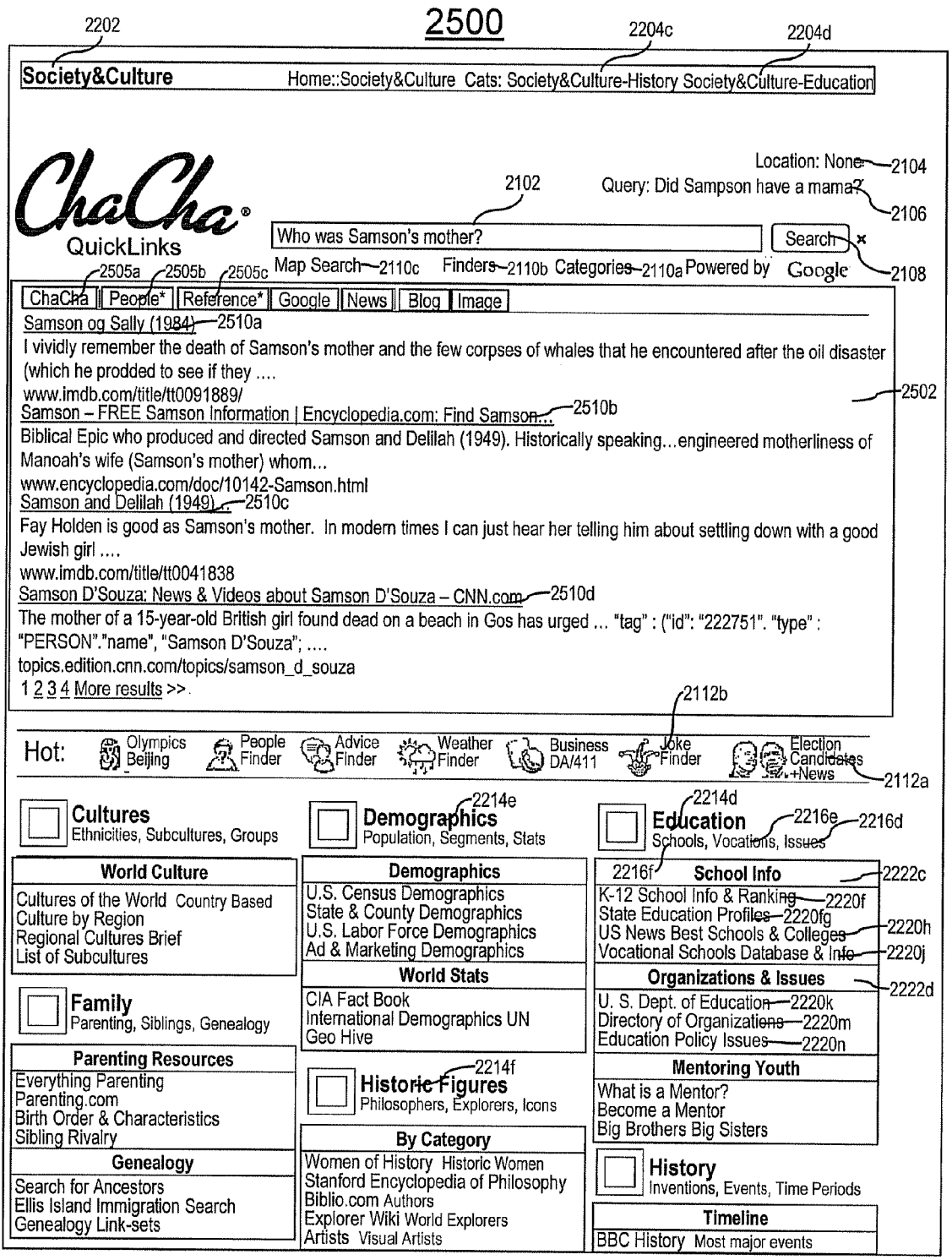
FIG. 25 illustrates a GUI for accessing custom search resources.

Resource type indicators 2222 may be used to provide a common 'look and feel' in the GUI 2200, 2300 (FIG. 23), 2400 (FIG. 24) and 2500 (FIG. 25). The content of the resource type indicators 2222 may be indicated in a database record indicated in the database 1820 (FIG. 18). The resource type indicators may allow visual organization of information without requiring a taxonomic separation. For example, the topic 'electronics' may have relevant information in 'News', 'Reviews' and 'Guides and Manuals', and the resource type indicators 2222a, 2222b and 2222c are populated to indicate these types of resources in a one or two word description. Other topics may include resources with the same or similar names functions. The resource descriptors 2218 may be used to indicate a more detailed description of resources which are associated with a category, and a topic. For example the resource descriptor 2218a provides a more detailed description of the content of the 'News' resources, and the resource descriptor 2218b provides a more detailed description of resources provided in the 'Reviews' resources.

Resource indicator controls 2220 may be used to access a resource indicated in the resource indicator control 2220 when activated. For example, the 'Wired News' resource indicator 2220a may be used to open the resource associated with 'Wired News', and the 'Tech Gadget News' resource indicator 2220b may be used to open the resource associated with 'Tech Gadget News'. Likewise, the 'Consumer Reports and Reviews' resource indicator 2220c may be used to open the resource associated with 'Consumer Reports and Reviews', the 'Reviews from Buyers' resource indicator 2220d may be used to open the resource associated with 'Reviews from Buyers' and the 'CNET Reviews' resource indicator 2220e may be used to open the resource associated with 'CNET Reviews'. Activity tracking may be implemented for any of the features of the GUI 2200.

When a query is associated with the categorization 'Society&Culture' a GUI such as the GUI 2300 illustrated in FIG. 23 may be presented which is customized to the category associated with the query. The category indicator 2202 and the subcategory indicators 2204 are modified to reflect the categorization. The subcategory indicators 2214 are modified to be appropriate to the new category. The 'Education' subcategory indicator 2214d indicates resources associated with 'Education', the 'Demographics' subcategory indicator 2214e indicates resources associated with 'Demographics', and the 'Historic Figures' subcategory indicator 2214f indicates resources associated with 'Historic Figures'.

The topic indicators 2216 are similarly modified. For example the 'Issues' topic indicator 2216d, the 'Vocational' topic indicator 2216e, and the 'Schools' topic indicator 2216f indicate topics associated with 'Education'. The resource type indicators 2222 may be modified to reflect the new categorization. For example the 'School Info' resource type indicator 2222c and the 'Organizations & Issues' resource type indicator 2222d reflect information associated with 'Education'. In the GUI 2300, the resource descriptor 2218 may be omitted as illustrated. The resource indicators 2220 may be used to indicate resources associated with the new categorization. For example the resource indicators 2220f, 2220g, 2220h, 2220j, 2220k, 2220m and 2220n indicate the resources 'K-12 Info and Ranking', 'State Education Profiles', 'US News Best Schools and Colleges', 'Vocational Schools Database & Info', 'US Dept. of Education', 'Directory of Organizations' and 'Education Policy Issues' respectively.

In the instance where a query is determined to be location sensitive, a mapping functionality may be provided. For example, selection of the 'Map Search' selection indicator 2110c may cause the GUI 2400 illustrated in FIG. 24 to be provided. The GUI 2400 may include a mapping window 2402 which may provide a map of a location associated with a query indicated in the query box 2102. Locations which may be relevant to the resources indicated in the subcategory indicators 2214 may be indicated in the map window 2402. For example, the query 'Where is the Indianapolis Motor Speedway Museum? Is associated with the location 'Carmel, Ind.' as indicated in the location indicator 2104. The Category indicator 2202 indicates that the query is associated with the category 'Society&Culture' is associated with the query. The subcategory 'Society&Culture-History' and 'Sports-Motor-Sports' are associated with the query as indicated by the subcategory indicators 2204e, and 2204f. In this case, the 'Sports' category indicator 2214g is provided.

Locations associated with the categories may be indicated in the map window 2402. A named entity such as 'Indianapolis Motor Speedway Museum' may be automatically transferred to the map search control 2404. Locations associated with highly rated resources indicated in the GUI 2400 may be identified in the mapping window 2402.

As illustrated in FIG. 25, a GUI 2500 which may be used to review results provided by a custom search engine (CSE) may be presented responsive to activation of the search control 2108. The GUI 2500 may include a CSE results window 2502. The search action button 2108 may be used to submit a query indicated in the query box 2102 for a search utilizing a number of CSE's. The CSE results window 2502 may include selection tabs 2505 and search result indicators 2510. For example, the 'ChaCha' selection tab 2505a may display search results based on a CSE definition which is customized based on resource rankings by administrators of a search service. The 'People' selection tab 2505b may display search results based on a CSE definition which may rank sites associated with persons more highly than general web sites, which may be defined based on information indicated in the database 1820. The 'Reference' selection tab 2505c may display search results based on a CSE definition which may rank sites including reference information more highly than general web sites. Any number of selection tabs may be provided in the CSE window 2502. Search result indicators 2510 may be used to provide access to a search result provided by a CSE. The 'Samson og Sally' search result indicator 2510a may access the resource 'www.imdb.com/title/tt0091889/' when activated. The 'Samson—Free . . . ' search result indicator 25106 may access the resource <www.encyclopedia.com/doc/10142-Samson.html> when activated. The 'Samson and Delilah' search result indicator 2510c may access the resource <www.imdb.com/title/tt0041838> when activated. The 'Samson D'Souza: . . . ' search result indicator 2510d may access the resource <topics.edition.cnn.com/topics/samson_d_souza> when activated. If a location is associated with a search request and the request is indicated to be location sensitive, a CSE definition may be modified in order to rank search results associated with the location more highly.

A CSE which is associated with a categorized query may be more likely to produce a relevant result than a generalized search. Any or all keywords associated with a search request may be provided to a searcher in a drop-down list or other similar control which is well known in the relevant art in order that a guide may submit any combination of the keywords and/or hyponyms and/or hyperonyms, etc. of a search request to the CSE's defined.

In at least one embodiment, a location of a keyword of a query may be identified so that if a search result indicator is activated, the first location or most highly rated location of the keyword in the document are located when the resource is activated. Multiple pages of results may be provided in an application such as a browser of a guide system such as the guide system 1805 (FIG. 18).

In at least one embodiment, a resource may be described using a number of database records.

As illustrated in FIG. 26, an exemplary resource record 2600 is provided, of which one or more may be associated with or resident in the search database 1820 (FIG. 18). The resource record 2600 may include a resource ID field 2605, a resource category field 2610, a resource subcategory or 'tile' field 2615, a resource text field 2620, a URL field 2625, a comment field 2630, a format field 1035, a source field 2640, a type field 2645, and a date field 2650.

The resource ID field 2605 contains an identifier of a resource, which is preferably unique and preferably used consistently. For example, in at least one embodiment, the resource ID field 2605 can include a randomly generated numerical code, and/or a string indicating a resource. A resource record ID serves to distinguish a resource record associated with a resource from a resource record associated with other resource. Although particular examples of identifiers are described herein, other types of identifiers uniquely indicating a resource may be utilized without departing from the spirit and scope of the embodiments. In at least one embodiment, the resource record ID is a text string. A resource record ID may include a resource description, a random number, and/or any other information which uniquely identifies a resource. Using the example in FIG. 26, 'Resource1 for SciTech' is the resource ID associated with the resource record 2600.

The resource category field 2610 includes information of a category associated with a resource. The content of the resource category field 2610 may be used to select a resource to be associated with a request. The content of the resource category field 2610 may be used to select a resource to be presented to a searcher when processing a request associated with a category. Using the example in FIG. 26, 'Category1 SciTech' is the category associated with the resource record 2600. This may indicate that the resource 'Resource1 for SciTech' may be presented to a guide and/or a user responsive to a search request associated with the category 'SciTech' in which the subcategory 'Category1' is highly ranked for relevance.

The resource tile field 2615 may include information regarding how a resource is to be indicated in a GUI. For example, the resource tile field 2615 may include a pointer to an element of a GUI which may be used to present a resource to a searcher. In at least one embodiment, a person may select content of the resource tile field. In at least one embodiment, a ranking or rating of a resource associated with a category and/or a subcategory may be utilized to determine whether a resource will be visible to a user in a GUI. Using the example illustrated in FIG. 26, the information 'Tile#6-4' is associated with 'Resource1 for SciTech'. This may indicate that 'Resource1 for SciTech' will be presented in 'Tile#6' in the fourth position.

The resource text field 2620 may include information of text associated with a resource indicator control 2220. Using the example illustrated in FIG. 26, 'Brain Anatomy Guide' is the text associated with 'Resource1 for SciTech'. As illustrated in FIG. 22, the resource indicator 2220p is associated with 'Resource1 for SciTech'.

The URL field 2625 may include information regarding accessing a resource. For example a URL which may be accessed when the resource indicator control 2220 associated with a resource is activated. The URL <http://www.waiting.com/brainanatomy.html> is the URL associated with 'Resource1 for SciTech'. Activation of the resource indicator 2220p may direct a browser application active on a user system and/or a guide system to <http://www.waiting.com/brainanatomy.html>.

The comment field 2630 may include information of text which may be associated with a URL and/or other elements of a GUI used to provide information resources to a guide. Using the example in FIG. 26, the comment 'Guides & Factsheets' is associated with 'Resource1 for SciTech'. Information which may be indicated in a resource type indicator 2222, a topic indicator 2216, or a resource description indicator 2218 may be indicated in the comment field 2630. For example, the resource type indicator 2222e indicates 'Guides & Factsheets'.

The format field 2635 may include information of how and/or if a resource is to be provided to a user. Formatting information may be associated with a definition of a GUI such as the GUI 2200 which may indicate any properties for display of a resource which may supersede other parameters associated with a form associated with the GUI 2200.

The source field 2640 may include information regarding a source or creator or owner associated with a resource. Information indicated in the source field 2640 may be used to determine a ranking and/or rating associated with a search resource. Using the example in FIG. 26, the source 'chacha quicklinks' is associated with the resource 'Resource1 for SciTech'.

The type field 2645 may include information regarding what type of information may be associated with a search resource. Any type of indicator may be used. Classes of resources may be defined. For example a resource may be identified by the type of information associated with the resource such as a URL, a search engine, a dynamic web page, an RSS feed, a database, and/or other type of resource which may provide information. Using the example in FIG. 26, the type 'URL' is associated with the resource 'Resource1 for SciTech'.

The date field 2650 may include information of a date associated with a resource. Information indicated in the date field 2650 may be used to determine when a resource was added to the database, whether a resource is being utilized, etc. Date information associated with a resource may be used for example to rank a search resource for display to a user and/or for adjusting ranking factors used by a CSE. Using the example in FIG. 26, 'created 18 Aug. 8' is associated with 'Resource1 for SciTech'.

In order to provide access to a search resource, a URL may be created. For example, a URL may be created responsive to receiving a query by the search system 1830 (FIG. 18). A URL may be based on a query, a structured query, a location, a profile, a categorization and/or other information associated with the query. If the URL is received by a server associated with the search system 1830 (FIG. 18), a web page associated with the URL may be provided and rendered in a browser application present on for example, the guide system 1805 (FIG. 18). A searcher may be able to locate a search result with reduced searching and navigation. Cutting and pasting of text from a search query may be reduced as elements of the search request may be made available via a URL passed to the server and rendered in the browser of a guide system.

If a query is received by the search system 1830 (FIG. 18), the query may be processed in order that a category, a location, a structured query, a keyword and/or other metadata which may be passed to a searcher may be associated with the query. If a query which has been associated with metadata is assigned to a searcher, the searcher may be provided with a GUI which allows the searcher to transmit a URL to a server which indicates the metadata and may provide a customized search tool to the searcher based on the metadata associated with the query. The toolset may be rendered using a uniform set of definitions which may allow a searcher to obtain a common 'look and feel' independent of the metadata associated with the query. As the search information is indexed in accordance with a taxonomy used to classify a query, the time required for a searcher to locate a relevant search result may be reduced.

In at least one embodiment, a URL is constructed which is a sub domain associated with a category. For example, <http://quicklinks.chacha.com/EntertainmentArts-Celebrities> might resolve to a webpage associated with the category 'EntertainmentArts>Celebrities'. Similarly information of other metadata associated with a query might be included such as the URL <http://quicklinks.chacha.com/entertainment-music?query=who+is+bob+marley&cat1=entertainment–dead+celebrities&cat2=events-concerts&loclat=38.096&loclong=–128.345.> The category would be 'Entertainment>Music', the query would be 'who is bob marley', the alternate categories (i.e., 'cat1' and 'cat2') would be 'Entertainment>Dead Celebrities' and 'Events>Concerts' and the location (i.e. loclat and loclong) would be 208.096 and –128.345. Any type of data might be included in a URL, which may be encrypted using various methods to prevent access to the server, if desired. Use of encrypted URLs may allow a category which includes information not generally available to the public to be utilized by a guide without compromising secure access to the information. Encryption may be preformed using any techniques which are well known in the relevant art.

If a URL does not resolve to a page, its parent URL may be resolved. Such a method may be used to allow an expeditor to select a categorization from a list, even if no resources which are customized to the category or subcategory or taxonomy branch which is assigned exists. Tracking of requests which are associated with the URL may be used to evaluate demand for resources associated with the categorization.

Using the methods and system described herein a search request may be processed and a search result may be provided. A guide assigned to a request may be provided with access to resources which may allow the guide to locate a search result. Resources presented to a guide are selected and rated based on a category and/or other information which is associated with a request. Resources presented to a guide are presented using a number of interfaces which allow a guide to obtain a common look and feel for any category. A toolset also provides a capability to perform a search using resources such as a custom search engine, a resource associated with a taxonomy used to categorize a query, a map functionality which may be associated with a location associated with a request, and/or other customized search tools. If a request is associated with multiple categories, multiple GUI's may be rendered. The category, location, keywords, etc. which are associated with a search request are provided in order that a guide may modify a category associated with a request and transfer a request to a different guide.

A toolset which utilizes information in a resource database associated with a taxonomy used to categorize a search query provides a guide with the ability to obtain information related to a search using highly rated resources associated with the category. Resources utilized by a guide may be tracked using features of the GUI's in the toolset. Tracking of usage may be used to rank and/or modify the content of the information provided to a guide in the toolset. A custom search engine or CSE may be used to locate a search resource or search result. A custom search engine may utilize a set of resources and/or other types of resources which may not be displayed to a guide. Use of a resource, which may be indicated by guide activity when using the toolset, may be used to determine if a human review of a resource may be needed.

A computer-implemented method of accessing information including associating a condition with a request based on one of input by a user submitting the request or a human assistant processing the request and converting the request to be automatically triggered when the condition occurs and providing a result to the user at each occurrence of the condition. In doing so, the request modified by the human assistant prior to the search.

Any or all of the operations described herein may be implemented via one or more hardware components. However, the present invention is not limited to any specific implementation of an operation. For example, one or more operations discussed herein may be implemented via software executed on a device while others may be executed via a specific hardware device.

The present invention may be implemented using a program stored, for example, in a computer-readable storage medium such as a CD-ROM, etc., or using one or more specialized terminals, devices or systems that is enabled to execute operation(s) described herein. The storage or recording medium used in an embodiment can be selected from among various computer-readable media including, a disk, a DVD, an internal storage device (memory such as RAM, ROM, FLASH) in a computer, etc.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the invention are apparent from the detailed specification and, thus, it is intended by the appended claims to cover all such features and advantages of the invention that fall within the true spirit and scope of the invention.

Further, since numerous modifications and changes will be readily perceived by those of ordinary skill in the art, it is not desired to limit the invention to the exact construction and operation illustrated and described, and accordingly all suitable modifications and equivalents may be resorted to while falling within the scope of the invention.

What is claimed is:

1. A method of providing access to information, comprising:
receiving a request;
defining, by a processor, a conditional request comprising a search query and a trigger condition when available conditional requests fail to match the request;
presenting the request and the conditional request to a person;
associating the conditional request with an originator of the request when the conditional request is accepted by the person; and
generating a search based on the search query when the trigger condition occurs after the conditional request is accepted by the person; and
performing the search via an automated resource selected based on an action obtained from the person before the trigger condition occurs when the trigger condition occurs after the conditional request is accepted by the person.

2. The method of claim 1, comprising:
defining the conditional request based on a selection by a human assistant from a list of trigger conditions ranked based on the request and directing the request to the human assistant when the human assistant is ranked highest for the request.

3. The method of claim 1, wherein the trigger condition is specified by a human assistant based on a previous search associated with the request.

4. The method of claim 1, wherein the search query is received from a user different from the originator of the request.

5. The method of claim 1, comprising:
associating a search resource with the conditional request when an action of a human assistant enables the trigger condition.

6. The method of claim 1, comprising:
presenting information of the available conditional requests based on a ranking of the available conditional requests for at least one of a keyword, a category, a user submitting the request, a guide performing searches, a trigger event, and a search result.

7. The method of claim 1, comprising:
determining a user associated with the request;
receiving a search result of a human assistant responsive to the request;
ranking conditional requests including the conditional request based on a keyword of the request;
presenting an indicator of the conditional request to the human assistant in an order based on the ranking;
obtaining a selection of the human assistant;
determining that the conditional request is accepted when the indicator is the selection; and
providing a notification of the conditional request to the user.

8. The method of claim 7, comprising:
obtaining information of a plurality of conditional requests based on a search phrase submitted by the human assistant; and
presenting information of a keyword, a category, a time, a user, a searcher, a resource, a search result and a trigger of the conditional request to the human assistant.

9. A system, comprising:
a user device submitting a request; and
a search service device receiving the request from the user device, defining a conditional query comprising a search request and a trigger condition when a match for the request is not found among available conditional queries, presenting the request and the conditional query to a person, associating the conditional query with an originator of the request when the conditional query is accepted by the person, determining a trigger criterion which enables the trigger condition, taking an action responsive to an occurrence of the trigger criterion and determining when the trigger condition occurs based on a resource identified by a guide responsive to the action.

10. The system of claim 9, comprising:
a guide device defining the trigger condition or the search request and receiving the conditional request based on a rank of the guide device for the request; and
a database storing information pertaining to users, available conditional requests, guides and trigger conditions.

11. A non-transitory computer readable storage medium storing therein a program for causing a computer to execute an operation including providing access to information, comprising:
receiving a request;
determining whether a query matching the request is available;
providing information of a suggested search when the determining indicates that a triggered request including the query and a trigger is not available;
selecting a human assistant ranked highest for the suggested search;
presenting conditional requests including a conditional request comprising the suggested search and the trigger to the human assistant;
obtaining an acceptance of the conditional request from the human assistant;
associating the conditional request with an originator of the request when the acceptance is obtained and the trigger has not occurred; and
transmitting the suggested search to an automated search resource selected by the human assistant prior to an occurrence of the trigger when the trigger occurs subsequent to the obtaining of the acceptance.

12. The computer readable medium of claim 11, wherein the request requires information to be obtained by a human searcher who is independent of a user submitting the request.

13. The computer readable medium of claim 11, wherein the request is received based on historical information of a user associated with the suggested search.

14. The computer readable medium of claim 11, wherein a guide selected to respond to the request provides the acceptance.

15. The computer readable medium of claim 11, wherein the operation comprises:
formulating the suggested search by a guide based on the request;
defining, by the guide, the trigger; and
responding to conditional requests associated with users using a search result obtained using the suggested search and the trigger.

16. The computer readable medium of claim 15, wherein an advertisement associated with the conditional request is transmitted to the originator of the request prior to the occurrence of the trigger, and the responding includes transmitting at least one advertisement.

17. The computer readable medium of claim 11, wherein the providing, the transmitting, and the determining are performed by selecting at least one guide.

18. The computer readable medium of claim 11, wherein the trigger comprises a criterion which causes information of an observation to be provided to a guide to obtain a search result regarding the occurrence of the trigger.

19. The computer readable medium of claim 18, comprising:
presenting an indicator of a resource for observing the trigger and a notification of an occurrence of the criterion to the guide when the criterion occurs;
obtaining from the guide, selections of the indicator, a response and an advertisement when an action of the guide indicates that the trigger occurs based on the observation of the resource; and
providing the response and the advertisement as a part of the search result.

20. A computer-implemented method of accessing information, comprising:
receiving a request;
linking, by a processor, a conditional search comprising a search query and a condition to an originator of the request when an action indicating acceptance of the conditional search is received;
receiving, by the processor, the action from the originator or a human assistant processing the request;
ranking conditional searches based on the request;
presenting the conditional searches including the conditional search to a user or the human assistant;
providing an indicator of the conditional search to the human assistant when a criterion and not all criteria comprising the condition is satisfied is met after the conditional request is linked to the originator;
performing a search when an action of the human assistant responsive to the indicator determines that the condition occurs; and
providing a result to the user at each occurrence of provided by the human assistant performing a search for information regarding occurrence of the condition.

* * * * *